US006823068B1

(12) United States Patent
Samid

(10) Patent No.: US 6,823,068 B1
(45) Date of Patent: Nov. 23, 2004

(54) DENIAL CRYPTOGRAPHY BASED ON GRAPH THEORY

(76) Inventor: Gideon Samid, 13 Tapiola Ct., Rockville, MD (US) 20850

( * ) Notice: Subject to any disclaimer, the term of this patent is extended or adjusted under 35 U.S.C. 154(b) by 0 days.

(21) Appl. No.: 09/493,031

(22) Filed: Jan. 28, 2000

Related U.S. Application Data

(60) Provisional application No. 60/143,642, filed on Jul. 14, 1999, and provisional application No. 60/118,114, filed on Feb. 1, 1999.

(51) Int. Cl.$^7$ ............................................... H04K 1/00
(52) U.S. Cl. ........................... 380/28; 380/277; 713/176
(58) Field of Search .............................. 380/28, 59, 37, 380/42, 44, 45, 43, 272; 713/176

(56) References Cited

U.S. PATENT DOCUMENTS

| | | | | |
|---|---|---|---|---|
| 4,910,772 A | * | 3/1990 | Matias et al. | 380/20 |
| 5,245,658 A | * | 9/1993 | Bush et al. | 380/28 |
| 5,270,956 A | | 12/1993 | Oruc et al. | 380/28 X |
| 5,675,653 A | | 10/1997 | Nelson, Jr. | 380/37 |
| 5,734,721 A | | 3/1998 | Clark | 380/46 |
| 5,841,872 A | | 11/1998 | Colvin, Sr. | 380/28 |
| 5,949,883 A | | 9/1999 | Ford | 380/28 |
| 6,219,421 B1 | * | 4/2001 | Backal | 380/28 |

OTHER PUBLICATIONS

Krishnamurty, Computer Cryptographic Techniques for Processing and Storage of Confidential Information, Int. J. Control, 1970.*
British General Staff, Manual of Cryptography, Aegean Park Press (1919).*
Rivest, et. al. A Method for Obtaining Digital Signatures and Public–Key Cryptosystems, communications of the ACM 1978.*
Delfs et. al., Introduction to Cryptography , Springer,2002.*
Denning, Cryptography and Data Security, Addison–Wesley.*
Simmons, Contemporary Cryptology, The Science of Information Integrity, IEEE Press.*
Menezes, et. al. Handbook of Applied Cryptography, CRC Press.*
Yasuhiro et. al. Dual reduction Method of Random Keys for Encryption by Graph transformation, 1988.*
Gaines, Cryptanalysis, 1956.*
Schneier, Applied Cryptography, 1988.*
jOxford English Dictionary, $2^{nd}$ edition.*
Krishnamurty, Computer Cryptographic Techniques for Processing and Storage of Cofidential Information, Int. J. Control 1970.*
Solution to the/cryptology/Beale problem, http://einstein.et .tudelft.nl/~arlet/puzzles/sol.cgi/cryptology/Beale, Dec. 14, 1999, pp. 1–5.
Internet–ERA Cryptographic Methods, http://tryagain.com/humcivil/crptweb.htm, Dec. 14, 1999, p. 1.
Leonardo/Daniel, Floating–Key Cryptography, D&G Sciences—Virginia Technology Corporation, Limited Release Notes, info@dgsciences.com, pp. 1–8.
Gideo Samid, "Cryptographic Possibilities Suggested by Certain Expansion–Reduction Algorithms", AGS Encryptions, Ltd., Jul. 4, 1999, pp. 1–23.

* cited by examiner

Primary Examiner—Kimm Vu
Assistant Examiner—James Seal
(74) Attorney, Agent, or Firm—Blank Rome, LLP

(57) ABSTRACT

The encryption method disclosed is based on charting a path on a graph, where the graph is the encryption key. The plaintext expresses that path through a sequence of graph vertices, and the ciphertext expresses the same through a sequence of edges between these vertices. There are numerous ways to construct the graph to match a choice of plaintexts with a single ciphertext.

7 Claims, 13 Drawing Sheets

The trail corresponds to the sequence:
W' Z' X' Z' Y' Z' Y' W' X' W' X' Y' .....>

Mapping a sequence of choice
W' X' Z' X' Y' W' Y'
On a given cipher.

Equivalence between arc-represented graph and adjacency representation.

DENIAL CRYPTOGRAPHY BASED ON GRAPH THEORY

RELATED APPLICATIONS

The present application claims priority of U.S. Provisional Applications Ser. No. 60/118,114 filed Feb. 1, 1999 and Ser. No. 60/143,642 filed Jul. 14, 1999, the disclosures of which are incorporated by reference herein in their entirety.

FIELD OF THE INVENTION

The present invention relates generally to encryption, and more particularly, to an encryption system in which the plaintext and the raw cipher are different lengths and to a denial featured cryptography. Additional applications include pattern recognition, and other situations in which one modifies the inferential visibility of data.

BACKGROUND OF THE INVENTION

Cryptographic systems have evolved along deeply seated "grooves": idiosyncracies. Mainly:

1. To express messages with a simple alphabet.
2. To render a message hard to read by creating a message form (cipher) which is expressed with the same or similar alphabet as the original message, and of the same size, or of fixed ratio vs. the original message.

Human languages are expressed with an alphabet which for most languages is limited to two to three dozen symbols. Cryptographers have embraced this paradigm, and thereby limited their process to ways by which a certain sequence of letters can be written in a different sequence (usually of the same alphabet), in a way that would confuse the unintended readers, but will allow the intended readers to use a reverse process (decryption) to uncover the original message which is assumed to be plain and readily understood.

Thus, the profound emotional expression of love can be expressed in English with its 26 letters as a statement:

I LOVE LUCY which is readable to all English readers, (making it difficult to comprehend for people not conversant with English—alas, that is not an aspect of formal cryptography, as defined above). To establish discrimination between those designated as intended readers, and the rest of the English speaking public, the same alphabet is typically used (same 26 letters), but an encryption process would transform the message to, say:

JKOCXNGHL

The process that leads from the original message (as it reads before the formal encryption takes it on), to the cipher has also fallen into a deep groove of conservatism. It is carried out in a mathematical process that requires another input, called "key" or encryption key, Ke. And the respective idiosyncratic maxim says:

3. Ke should be as small as possible.

The intended reader, so the paradigm premise says, has his or her own key, a reading key or decryption key Kd which together with the cipher serves as an input to a decryption algorithm that uncovers the original message M. Kd is often the same as Ke (Kd=Ke) but not necessarily so. At any rate, Kd also submits to the smallness maxim:

4. Kd should be as small as possible.

The published consensus of the profession has also subscribed to:

5. Kerckhoff Law: which states that a good cryptographic system is one in which everything is fully exposed except the very identity (not the format) of the decryption key Kd, which too is expected to be a selection among a finite well known possibilities.

The term "published consensus" warrants some elaboration. Cryptography is unique in as much as its maximum benefit is achieved when its achievements are left undisclosed. Furthermore, a would be cryptanalyst (codebreaker)—an unintended reader in our terminology—has a lot to gain by convincing cryptographic message writers that he or she can not read ciphers constructed with a certain encryption algorithm, which in fact the code breaker can "break". If the message writer believes it, he or she would aggregate the important secrets into that cipher-paradigm, thereby helping the cryptanalyst. The latter will not only be able to read the sensitive secrets of the message writers, he or she would also enjoy a distinct selection between what is sensitive and secret, and what is not. This is because the gullible message writer is likely to point to his or her secrets by the very fact that he or she would encrypt them. It is an irony that in such cases, it is better not to encrypt anything, and thereby achieve some protection by "drowning" the secrets within reams of innocuous information. For these reasons there emerged a big gap between what is officially said, and published on the matter, and what is actually happening in the clandestine ditches where the battle for timely knowledge rages with great zeal and some unbecoming side effects. Therefore, unlike the case with other fields of science, one should be rather apprehensive in regarding the "published consensus".

One enlightened way to review the previous art is to use the historic time-line. We may discern several distinct eras:

1. Antiquity up to WW-I.
2. WW-II encryption.
3. Electronic Computing Era.
4. The era of the information superhighway. (Internet).

Antiquity up to WW-I

Up to WW-I formal encryption was based on changing messages written in Latin or prevailing alphabet by creating a message of equal size (in most cases), with the same alphabet. The changes were of two types: transposition and substitution: changing the order of the letters, or replacing each letter with another. The result looked so confusing that only determined mathematicians even tried to break those ciphers. Yet, for those mathematicians it was usually a matter of patience.

In most cases in this era the substitution process was fixed per letter; that is if the letter g was substituted by k in one appearance, it was substituted by k for all other appearances. This type is named monoalphabetic substitution. The term is a bit misleading. The 'mono' attributes suggests that for each substituted letter the substituting letter is always the same. The 'alphabetic' attribute suggests that the encryption happens through fiddling with alphabet.

Monoalphabetic substitution encryption has a gripping charm, perhaps because on one hand it appears so unsolvable, and on the other hand it just about always yields to patient amateur attacks. The fact is that even today when monoalphabetic substitution is obsolete for any serious business, it is live and well in the world of entertainment, and a large variety thereof is found in form of puzzles, riddles in most respected dailies and magazines.

That charm of simple alphabetic substitution sank this mode into the consciousness of the craft, and determined its further development for centuries. Encryption as it developed remained locked into this basic premise; adding, over the years, two modes of complexity (identified herewith, discussed below)

1. Homophonic substitution
2. Polyalphabetic substitution

The object of those complexities was to throw as many obstacles as possible on the path of understanding against the unintended readers.

A paradigm developed. The writer puts his message into ordinarily language writing, using the common alphabet (26 letters in English). That writing is called the plaintext; suggesting it is plainly understood. The encryption was limited to changing the plaintext to a message which was expressed with the same alphabet (26 letters in English) but its appearance was different enough from the plaintext that the latter would not be easily discovered. This hard to understand message form was called ciphertext, or simply: cipher.

The homophonic complexity, (not a very telling name), was comprised of mapping a single letter into two or more letters. Instead of mapping j to y, one mapped j to uyr. This tripled the size of the message in its cipher form, but kept the ratio between the plaintext message (before the encryption) and the cipher (after the encryption) fixed, which means that once the method was identified, the cipher length betrayed the plaintext length.

The polyalphabetic variety, was a one-to-many option in terms of replacing the same plaintext letter with a different (or same) letter each time. That is, k would become p on one appearance, c on another, n on the third etc. This variety turned out as the most serious avenue for encryption development for years to come. The big question was how to build such a mapping variety. In the monoalphabetic case one needed only a simple table that would match a plaintext letter with a cipher letter. But if a can be b on one occasion, c on another, d, e, f . . . including a—on different occasions then clearly there must be something else other than the identity of the plaintext letter that would dictate which is the letter to map into (the replacing letter). That something else could be:

The rest of the plaintext
The rest of the ciphertext
Additional information—neither the plaintext, nor the ciphertext in any combination. A rich mathematical variety was developed to create increasingly complex combinations, and this trend lingers today.

That variety (of polyalphabetic complexity) may be cast as:

1. Polygram encryption
2. Order driven encryption
3. Hitherto encryption
4. "full-rest" encryption 1. Polygram encryption: In a polygram the substitution choice for a given letter depends on its immediate neighbors. The plaintext letters are being taken 2, 3 or more at a time and the substitution is based on the identify of these groups. Thus AB would become GH and AC would turn up as UK, (in a 2-gram substitution).

2. Order driven encryption: The replacement choice for a given letter was based on its position as counted from the beginning of the plaintext. For most cases this was periodic, meaning that the rules to replace a letter at position i (i=1,2, . . . ), was the same as for the letter in position j where ti $j=i+k*p$ where k=1,2,3, . . . and p is an integer called a period.

3. Hitherto Encryption: In this variety the rules to replace a given letter were based on what happened in the encryption process up to that point the "hitherto" information could have been within the plaintext letters up to that point, or within the developing ciphertext up to that point, or a combination thereof.

4. "Full Rest" encryption: This variety, widely considered the most complex, says that the replacement choice for a given letter would be determined by the rest of the plaintext, the letters beforehand, and the letter to follow. This option was too difficult to implement prior to the introduction of electronic computing.

The centuries of encryption prior to WW-II showed a distinct consolidation around the polyalphabetic procedure, gradually pushing all other methods into the shadows of the non-published, non discussed category. Few stories survived, but no one knows how many were lost, or how extensive the imaginative non conservative encryption was, and what was its role in human history. In most cases the non alphabetic options were based on graphics.

The growing strength and complexity of encryption procedures had an important impact. It downgraded the art and science of secret writing (steganography—the practice in which one hides the very existence of a message, rendering it unnecessary to decrypt it). Perhaps the reason is that hiding message existence was more an art, and less regimented, less mathematical, less provable, less repeatable than encryption. Psychologically the encryption designer thumbs his or her nose at the unintended reader saying: Try this! who is a better mathematician? In message hiding there is no "in your face" boasting.

To further understand the world of encryption in previous centuries and its impact on today's practice it is necessary to bring up the aspect of hostility zones.

Hostility Zones

In an encryption situation the discrimination between the intended reader and the unintended reader happens by exchanging information between the writer and the intended reader in a zone or an environment which is considered safe, or hostility-free. Hostility here is expressed by the eavesdropping capability of unintended readers. The prevailing paradigm was that minimum information is exchanged in the hostility-free zone. But that little information should allow a safe exchange of even a large volume of information carried out in the hostile zone. Safe exchange means that the hostile unintended readers would not be able to decipher without crossing a threshold of "cracking" effort. Why such a paradigm? Because this allows for two people to exchange minimum information at a given time in a hostility-free zone, and then exchange future information in large quantities in hostile areas; that is information which is not available while the two are talking safely. This premise is identical to the above mentioned notion of small keys. In fact the information which is exchanged in safety between the writer and the intended reader is the method to be used for the encryption, and the key (which is by definition all the information exchanged in hostility free zone, other than the method itself).

Historically it was considered safest to commit the key and of course, the method to memory, so encryption professionals were driven to devise smaller and smaller keys that would provide better and better security (stronger discrimination between the intended and the unintended reader).

In response, cryptanalysis, (the effort to break a cipher, to become a successful unintended reader), was focused on discovering that key. Since the key was smaller than the plaintext, there was a smaller field to search for it, and hence the better the chances.

Up until World War II, the small key monoalphabetic, then polyalphabetic ciphers were in vogue. Code breaking consisted of a systematic exhaustive examination of possibilities, employing mathematics, injected with a large body of clues and support data. These clues were part public information that was compiled to useful parameters, e.g. the frequency of letters in a given language, the frequency of words, or the frequency of words which have two or more of the same letter etc. The other part was case dependent. If the unintended reader knows who the writer and the intended reader are, he can surmise what the plaintext message could be, and use this information to accelerate the exhaustive search for the answer (the plaintext).

Throughout the pre-WW-II era and beyond, unintended readers enjoyed two crucial advantages in their attempt to read encrypted messages:

1. They generally knew which method was used.
2. They knew when they "got it" (when the cryptanalysis was successful).

Acting as a shadowy cult, the encryption practitioners have been communicating with each other in conferences, publications and personal communication. In Europe where this tradition was most developed, friends became foes, and foes became friends with the frequent change of political winds, and so code breakers of one country had a pretty good idea of the mind set and the method used by their now opponents. Since most encryption practice was military oriented, the methods in use were officially documented and largely distributed. This made it very common for code books, and code officers to fall into enemies hands, betraying at the very least the method in use. And since it was deemed cumbersome and onerous to change a method, compared to changing the key, the latter was the option of choice. Later on, Kerckhoff, a Dutch encryption professional, formulated his law that states that encryption procedure must be thoroughly tested, and thus it must be made public, and eventually carry its full secrecy value and right in the identity of the key itself.

The other, perhaps the most important advantage for code breakers was the fact that the methods used were such that there was no confusion as to whether or not the code breaker arrived at his coveted target—the plaintext. It was statistically unlikely that more than one reasonable message would be converted to the same ciphertext. In other words, knowing the method in use, and having even a slightly different key than what was actually used, would create a meaningless plaintext which was clearly not it. This, in and by itself, would offer a critical feedback to the code breaker. He would know when to try again. And if and when the plaintext would emerge as a meaningful message, expected of the known writer, then there would be that important signal that the job was done—the code broken. Having only one plausible solution to a cipher is prevalent in today's practice. Mathematically:

Using any polyalphabetic encryption method or close variety thereof, E, for which the corresponding decryption algorithm is D; if plaintext M turned into cipher C by employing encryption keys $K=K_e=K_d$, then it is highly unlikely that there is another key $K' \neq K$ such that by decrypting C with K' it would yield plaintext $M' \neq M$, in such a way that M' would be interpreted as the original message, M.

Overall the role of encryption prior to World War I was not extremely critical. Message hiding was arguably more important and more productive. And the question of who won, the code breakers, or the code writers is too dependent on arbitrary definitions of winning and losing. Alas, in World War One a single instance of code breaking changed world history. An encrypted cable written by the German foreign minster, Zimmerman, to his ambassador in Washington, was broken by British intelligence who forwarded the plaintext to Woodrow Wilson, the American President, and the resulting anger plunged the US into the war. Otherwise, the isolationists pull would likely have prevailed, Germany would have had a good chance to win World War One, and the history of the world have been quite different.

This single instance created shock waves world wide, and since then encryption was no longer a shadowy craft known and minded by esoteric few, but rather a make-it-or-break-it factor in prime time world affairs. And it has been like that ever since.

The Zimmerman turning point also indicated that even if only a tiny fraction of encrypted messages is being cracked—the impact may be world dramatic. When World War II came around, all the belligerent countries took encryption to new heights, using the best technology of the day to devise more and more complex ciphers, and to break the same.

The World War Two Encryption Era

Using electro mechanics, a combined feat of mathematics and engineering produced cipher machines which employed newly complex polygraphic encryption. The basic procedure was curiously similar through the belligerent forces of the second world war. The American Sigaba, the British Typex, the Japanese Purple, and the German Enigma all use a large key which is derived from a smaller key, and while it looks random, it is not, and to that extent it is vulnerable to attack. The annals of this greatest human tragedy indicate that these electro mechanical polygraphic cipher machines were highly breakable under the relentless war effort of the respective code breakers. The Germans broke the British merchant code; Enigma and Purple yielded to the allies. The impact of these broken code was substantial, many lives have been saved, many have been lost on that account, and arguably the war could have turned up differently without these mathematical feats. Having used the adjective 'mathematical', it is worth noting, that in all cases, a substantial non-mathematical factor was playing a pivotal role. The electro mechanical devices were captured, people talked, and psychological warfare weighed in heavily.

Two characteristics of WW-II encryption are retrospectively important:

1. Low volume per analyst
2. Developing encryption mathematics and formal complexity assessment A German U-boat would pop out its antenna and spurt a short message to headquarters. The message would be radio captured and then become fodder for thousands of British analysts in Bletchely Park near London, all working on reading the code, using purloined enigma machines.

A large cadre of mathematicians have sharpened their WW-II pencils on advancing a previously sleepy branch of mathematics: number theory. Prior to the war, one mathematician, Fermat, would propose a theorem, (the Fermat theorem) in 1640, Euler would offer a proof in 1736—a century later. In the war number theory was combined with statistical analysis and engineering to actually compute how difficult would it be for the unintended reader to read the plaintext.

Encryption mathematics was expressing the fundamental tenet of the prevailing encryption mode: letter-for-letter in a polyalphabetic fashion. The respective mathematical tool was module mathematics: a mathematical analysis in which any large series of numbers is mapped (matched) to a relatively small, fixed set. Any large as desired integer L is mapped to one of the numbers 1 to n, by dividing it by n, and matching it with the remainder, r:

$$L=k*n+r$$

where k is any integer, and $0 \leq r \leq (n-1)$. Gauss in 1801 expressed this matching through the congruence symbol (which we shall here use interchangeably with "=", where no confusion may arise).

$$L=r \pmod{n}$$

The mathematics of encryption would nominally use n=26 for the 26 letters in the nominal English alphabet, and propose complicated algorithms to manipulate large numbers which would then be matched to a letter of the alphabet through module mathematics.

Module mathematics and letter for letter encryption would stay in the main stream for decades after the war. It was clear, elegant, and it offered a very practical advantage: it lent itself to product encryption.

Product Encryption

Product encryption is by definition encryption of encryption. Intuitively, if one takes a cipher and runs it again into the same, similar or dissimilar encryption cycle, then the outcome would be 'further away' from the plaintext. By repeating the process once more, and again, one, arguably, would increase the 'decryption mileage', making it more difficult to break. In pre WW-II era product ciphers were desirable but not too practical because of the manual burden they imposed on the intended reader. The intuitive desirability of product ciphers locked in the letter for letter paradigm, because only by keeping that paradigm would it be possible to take a cipher and treat it as a plaintext to create another cipher, and then repeat the process again and again.

On second thought, product cipher is an expression of weakness. It acknowledge the ease of breaking a single decryption cycle. Alternatively put: the better the encryption, the less it would benefit from recycling.

The critical legacy of the war was that additional complexity was needed to build secure ciphers, and to crack opponent's codes. It also manifested the role of non mathematical input into the code breaking art, and from that time on, each country has sunk in fortunes and nurtured a cadre of its most brilliant mathematical minds in waging the war of secret codes.

The Electronic Computer Era

The electronic computer emerging after the second world war, has become the indispensable tool of modern cryptography. It allowed complex crypto system design, and equally complex cryptanalysis. The legacy of the great war was that mathematics wins. And so in parallel with the increasing computing power, a tidal wave of mathematical research has thrust the field into its present state. The implicit fundamental assumption of the various methods today is embodied in the claim that all the unintended readers suffer from explicit mathematical ignorance. Specifically, the attacking cryptanalysis is not smart enough to figure out a way to accelerate the brute force search (exhaustive search for all possible keys). Such dumb crypt analysts are assumed to use the fastest computers available to them, and thus a figure of how long it would take those analysts to break the code is so often pronounced as a proof of cipher resistance. It is a fundamental weakness, which for some borders at mathematical pomposity: a mathematician saying: I tried to find mathematical insight to break the cipher, and failed. Ergo: everybody else will certainly fail!

The only proposed crypto system which is mathematically secure, is the one known as the infinite key, or one-time pad, which is considered impractical in its pure implementation.

In a bird's view modern cryptography is based on complex algorithms fed by the plaintext and the "key;" spewing a ciphertext as large as the plaintext. The prevailing methods use a binary sequence as a key. The first distinction is with respect to its length:

large keys
small keys
Large Key Cryptography

In its extreme case the key is as long as the message itself. (This is the infinite key method mentioned above). This equal length removes the key from the status of being the weakest link, or the crypt analytical target. A key as long as the message itself no longer contains less uncertainty than the message it encrypts. As a matter of fact, the equal length key can be made less attractive than the message by producing it as a random sequence, where as the plaintext message suffers from the idiosyncracies of the human language.

One simple implementation of this large-key method is as follows:

1. Write a plaintext, (P), as a binary sequence of length L bits.
2. Generate a key, (k), of length L random binary digits.
3. Process P and k as a bit-by-bit exclusive-or (XOR), to yield an L-bits long cipher, C.

The practical question is how to transport the long key to the intended readers. If an L size key is generated at a certain time point, and shared with an intended reader, then the writer-reader will enjoy a mathematically secure system that would be good for an L-bits long message. For additional communication, more key-bits must be generated, and shared. This burden diminishes the practicality of this paradigm. Most of the practical users have retreated to small size keys.

Small Size Keys, Computing-era Cryptography

These methods are divided into three categories:
1. Pseudo-random long key generators.
2. Symmetric short keys
3. Asymmetric short keys The first category is an attempt to employ a long key that would pass for a long random sequence. The idea is to employ an algorithm that would use a short key as part or all of its input, and then generate an unending sequence that would be as close as possible to a true random series. This theoretically attractive method is not very popular arguably because, it is difficult to ascertain a mathematical measure of its vulnerability. Mathematically, the longer the message that is encrypted with that pseudo-random key, the more distinct its pattern—it's distance from pure randomness (a vague concept anyway). Say then, that pseudo-random long keys, or as they are commonly called, stream ciphers, suffer from increased vulnerability proportional to volume and usage. The more popular methods, discussed below, appear to be of fixed vulnerability, measurable through time to cryptanalyze. These measurements, as claimed above, rely on the implicit assumption of mathematical ignorance.

The prevailing cryptography is based on fixed-size small keys which will resist a timely brute force analysis, and which are based on algorithms that would defeat any attempt to accelerate that brute force cryptanalytic strategy. As outlined above these methods are either of the symmetric type, or the asymmetric type. Symmetry means that decryption is carried out essentially as a step by step reversal of the step wise encryption process. Asymmetry means that decryption is sufficiently different from encryption. In both cases the combined encryption-decryption process should reproduce the plaintext. But in the symmetric case it is akin to taking a trip from point A to point B, and then returning through the same track, while in the asymmetric case, the trip back to A, takes a completely different route. In the symmetric case one must hide the encryption process since it exposes the decryption route. In the asymmetric case the encryption can be made public, since the way back to the plaintext is sufficiently different, mathematically speaking.

Symmetric Key Computing Era Cryptography

This paradigm calls for a fixed size key to be shared by writers and readers alike. That key, until changed, would be used for writing secret messages and for reading the same. Once they key is compromised, security is lost.

The most popular and best known representative of this paradigm is DES.

DES—Digital Equipment Standard is the dominant Published cryptographic standard in the post World War II era. Until the late 70's, Des and its variants were just about everything in publicly-exposed cryptography. The standard has been patched, enhanced, and augmented, and in its many implementations it is still the backbone of commercial cryptography, used throughout the global financial world, and elsewhere.

DES is clearly a computer-era extension of the classical ciphers. It's designers appears to have asked themselves: how can we use the new tool, the electronic computer, to "cook" the age old transpositions and substitutions into such a complicated sequence that cryptanalysis will be prohibitive. DES raw input is any text file, or information sequence of any length, P, which is eventually encrypted into a cipher of equal length, C. The encryption is undertaken through a fixed size, relatively small, binary sequence, the key, k.

$$C=E(P,k)$$

Where E is the DES encryption algorithm. E is published, and has no secrets per se. The entire cryptanalytic strength of DES is hinged on the identify of the key k. DES is symmetric: its decryption key Kd equals its encryption key Ke (Ke=Kd=k). Thus the intended reader, would use k to produce:

$$P=D(C,k)$$

where D is the DES decryption algorithm—an exact reverse of the encryption process.

The original size key, as proposed by DES developers, (IBM), was 128 bits. When it became a standard it was reduced to 56 bits. As computers became more powerful, the size of the key inched up again. But at any rate, it is very small compared to the size of the encrypted message. This size variance pin points the cryptanalytic efforts on the identify of the key—the weakest link.

DES security is based on the non-Bayesian assumption which says that checking i key-options out of a total of r key possibilities, will not modify the equal-likelihood of the remaining (r-i) key options, regardless of the choice or value of i. In other words, it would be necessary for a cryptanalyst to use the brute force approach: to check every possible key configuration. Accordingly one would assume that a cryptanalyst is privy to a plaintext and its cipher, and is using the fastest computers available to him for finding k, to be used for reading all other messages based on the same key. This assumption can be translated into time needed for a successful cryptanalysis based on knowledge of the computing power of the cryptanalyst. And in turn, this estimate allows for appraising the adequacy of a given key size.

The critical question with regard to DES security is the validity of the non-Bayesian assumption. The fact that DES was officially certified by the U.S. government, has only increased suspicion among many professionals, owing to the fact that it would be advantageous to certify a cipher which is strong enough to resist all cryptanalytic attacks, excepts those launched by the certifying authority.

On its face DES appears as a very arbitrary algorithm. It's fundamentals have not changed over the years. This fact leads some to believe that the selected algorithm offers a trap door: a way for someone equipped with proper computing power and the right mathematical insight to find the desired key much faster than the nominal brute force attack.

DES is fully deterministic: the same input produces the very same output time and again. This fact opens an attack door by allowing small changes to the input stream, then monitoring the impact on the cipher. DES may be implemented through hardware, or through software, which is typically three orders of magnitude slower. DES Described: The input information to DES is first expressed in a binary form. The binary stream is divided into fixed size blocks, each containing 64 bits. Each block is then processed through the core DES operation to produce a 64 bit of cipher, using a 56 bits key.

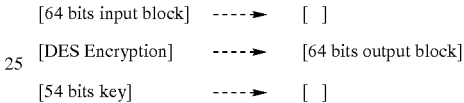

The encryption process is based on a succession of changes, (stages), each based on the result of the former. By order:

1. Key Independent Transposition
2. Key Dependent Bitwise Operations
3. Key Independent Transposition The 64 input bits are processed through the key independent stage (1) above. Their output is processed through the key-dependent stage (2), and that output is processed through stage (3) above. All inputs and outputs are 64 bits long.

The key-independent transpositions simply switch locations of the input bits. The key dependent operations are several (the standard is 16) successive steps, each of the form:

1. Divide the 64 input bits to the leftmost 32 bit, L, and the rightmost 32 bits, R.
2. R will become the 32 leftmost bits in the output block.
3. L and R will be processed together with a derived key k' The result is a
32 bits string which becomes the rightmost 32 bits in the output block. In detail: The derived key k' is a string of 48 bits derived from the original 56 bits key. For each step in that stage, there is a different derived key'.

The processing step in (3) above is as follows:

3.1. Expand R from 32 bits to 48 bit (Re), (by duplicating some bits based on their positions).

3.2. Combine k' and Re in an Exclusive-Or Operation to create a new 48 bits string, O.

3.3. The 48 bits 0 string is then divided into 8 groups of 6 bits each.

3.4. Each 6 bits group is then processed through a position dependent process into a 4 bits block.

3.5. The 4-bits blocks are concatenated to form a 32 bits block, T 3.6. T is transposed to create a permutation thereof, Tp (32 bits).

3.7. Tp and L undergo an exclusive-or operation to yield a 32 bits string, which becomes the result of step 3 above.

The description above leaves a few implementation details unspecified, and that is in line with the variance of the various implementations. DES decryption works in reverse order.

Asymmetric Key Computing Era Cryptography

Since 1976, when Diffie and Hellman proposed the concept, the actual implementations thereof were based largely on mathematical operations which are easy to carry out one way, but not in the reverse. Such as:

1. Large numbers factoring
2. Discrete logarithms
3. Operation research (OR) problems Many other mathematical cases where proposed, but they failed to attract popular application based on the previously mentioned fundamental implicit assumption. To use an asymmetric paradigm the cryptographer must be thoroughly convinced that exposing the encryption process will not betray the decryption phase. One can not guarantee that future mathematical insight, or that existing, but secret mathematical knowledge is not at a level that would render asymmetric crypto system practically vulnerable. Consequently, mathematicians, feel more comfortable with the above listed tracks which are based on problems that have been attacked for many years, and are still considered too difficult to solve, or say: have not yielded to fast solution insight.

The asymmetric public key algorithms follow the historic trend to employ Galois fields based on module arithmetics.

The most popular asymmetric method is analyzed below:

Large Numbers Factoring

Proposed in 1977 by Rivest, Shamir and Adelman, and known by the first letter of their narnes: RSA, this track works as follows:

Plaintext, P, is divided into blocks of size B. Each block B is encrypted using a pair of publicly available numbers (e,n). The resultant cipher is of size B (per block), and the encrypted blocks are concatenated to form the cipher C, corresponding to P.

$$C=E(P,e,n)$$

With P,e, and n in the open, security is based on the difficulty to reverse the encryption paradigm E, which is defined per block as:

$$c=b^e (\mod n)$$

where b is the numeric value of any plaintext sequence of any block of size B in P, and c is the numeric value of the corresponding cipher sequence for that block.

A cryptanalyst will have to deduce b from knowledge of c,e, and n. Since there is no published formula, or accelerated method to extract b from the above formula, it is assumed that a cryptanalyst will have to essentially use a brute force approach. Hence by selecting e, and n large enough, the reverse encryption will become slow enough.

The intended reader will decrypt the cipher C, block by block. For each block:

$$b=c^d (\mod n)$$

where d is a secret number, large enough to frustrate brute-force analysis.

RSA system calls for finding two large numbers, e and d such that the above encryption and decryption can be implemented. e, and d ( and the corresponding n) are extracted from an obscure number theory theorem:

for any two numbers e, and d such that:

$$ed=1 \mod \phi(n)$$

it holds that for any b:
ti $(b^e)^d \mod n=b$ (n) is the number of numbers less than n, which are relatively prime to n.

Accordingly: if $$c=b^e (\mod n)$$

then:

$$b=c^d (\mod n)$$

which is exactly the RSA process. To prepare the system, the designer will have to identify a tuple (e,d,n) to fit these relationships. RSA inventors offered an algorithm for extracting such tuples at will. The security of their selection is based on the assumption that factoring large numbers is a very difficult and time consuming process.

RSA is typical in the sense that even the 'easy' mathematical operations are quite complicated, and as a result encrypting large files is time consuming and rather unwieldy.

Published Variety: All the above described categories (pseudo-random keys, short symmetric keys, and short asymmetric keys), have become target for an increasingly rich body of literature. By and large, most of these proposed algorithms remain a literary spectacle, with little application. The reason is fundamental: to certify, or even to recommend a given cryptographic algorithm, one must have spent considerable time trying to expose its weaknesses, if any. It's difficult to find anyone to invest in such exhaustive mathematical analysis, for an algorithm that no one uses. It is a "Catch-22" syndrome: new algorithms do not become popular, before they are being "blessed" by the professional community. Alas, non-popular algorithms can hardly justify the pre-blessing process.

This rich variety and corresponding obscurity of cryptographic methods, may, on one hand lure savvy users who might assume that their predators would not suspect the use of an obscure algorithm. Alas, this lure is counterbalanced by the fear that once suspected, the employed algorithm would readily yield to a smart mathematician.

For the increasingly large community of cryptographic consumers, the choice is quite narrow: anything that is "blessed" by the mavens, and well "packaged" by the sellers. And thus today we see the volume of sensitive financial data and its like being handled through DES, and its various variants, while the e-mail, and rogue users flock to PGP (Pretty Good Privacy). PGP: "Pretty Good Privacy" is a well packaged hybrid product. It offers the advantage of RSA asymmetry, and the speed of DES-like file transmission (A non-US developed algorithm called IDEA). Two PGP users who have had no prior contact, and exchanged no secret information can initiate their contact by writing to each other through their respective, published public key (as described above). PGP then uses this initial contact to create a common symmetric key, which they both use from that point on.

PGP advantage is also its shortcoming. It allows two strangers to exchange sensitive information, without one really ascertaining the identify of the other.

Operational Status

While mathematical integrity is the heart of a wholesome cryptographic system—its body is comprised of a slew of practical issues which must all be satisfied for the service to function. Cryptography is overhead, a burden. It must match the threat. If it does not, or if it is perceived as a mismatch—the effort would fail in the long run. That is so whether the cryptographic procedure is too meager, or too strict. Then there are the unintended side effects. Poor cryptography helps an opponent find what is sensitive and what is not. Overzealous cryptography has on some occasions locked the data even from its owner (e.g.: when keys are lost). Unlike television which offers its consumers good service regardless of their ignorance relative to the electronic technology that brings the picture to their living room, cryptography requires well trained users, to be effective. When only few used it, the training problem was limited. As it becomes a commodity—cryptographic education is of greater importance. And so is the need to establish cryptographic security on mathematics which is accessible to the multitude of non-professional mathematician, those who are intelligent laymen. Which is the edge that this invention emerges from.

Computer ushered in the so called information age. Most of what people do is increasingly expressed in computer files, and with it we all experience increased vulnerability to eavesdropping, and data theft, making encryption a necessary burden for many ordinary people. This transition from esoterica to main street brings with it fundamentally new demands which are yet to come. The need is much more pronounced in the coming age of intensive interconnectivity.

The Age of Mass-Interconnectivity: The Information Superhighway (The Internet)—a Prospective The obscure and arcane art of cryptography is in the midst of a metamorphosis into an indispensable utility that would help render the Internet into a global repository, access, and communication of the full range of human data. The new need will inspire an unprecedented broadening of the offerings in product, technique and methodologies. The metamorphosis of cryptography will probably be emphasized through:

Dataship: Insuring Data Ownership on The Public Data Highway

First the premise: the Internet attracts so much growth that it has fast overtaken all its competitors with respect to public data traffic. Even the conversational phone system is now being sucked into the Internet bowls. Faxes which yesterday seemed to be the wave of the future, now give way to email, and its attachments. Large organizations have invested in building their own private communication network—which now, too, lose traffic in favor of the public highway. Much as the automotive system is based not on private roads, but on public thoroughfares, so will the movement and parking of information.

However far a car travels, when stopped by a police officer, its identity, and ownership are readily exposed. Automotive theft is minuscule compared to the number of cars and the miles they log. And similarly for data: ownership, and protection should be firmly established.

Accordingly, one may paint a situation where data travels in functional packets comprised of: data payload, and data overhead. The former is the contents which is being transported from a sender to a receiver; the latter is all the data that is necessary for safe transportation of the payload.

It appears necessary to link the payload and the overhead in a tamper resistant, and accident resistant fashion. Without which the specter of data driven public disaster is way too real. If we had no locks, and no car and driver registration system, we would have had chaos where people drive whichever car they find on the parking lot.

The two questions that beg answers are:
1. How to fuse payload and overhead
2. What should be the contents of the overhead
Thumbnail answers follow.

Fusing (linking) data payload and data overhead. The key here seems to be data representation. The initial separation between the two parts should be eliminated by using products related to cryptography, which will create one data packet in a way that removing or chaining any part thereof will destroy both payload and overhead. In other words, it would be difficult to separate the two parts, and then somehow attach a new payload to the separated overhead, or vice versa.

About the contents of the overhead. Perhaps we can take a page from Mother nature: every single cell in our body carries in its DNA the full range of information necessary to rebuild the body as a whole. Ideally, the overhead data should tell as much as possible about the message: who sent it, to whom, and as part of what larger communication, or action it happens to be.

SUMMARY OF THE INVENTION

Daniel (alternatively written as DNL) is a cryptographic paradigm, featuring ease of matching many plaintexts of choice to any give cipher (the deniability property). Consequently, the cipher itself cannot betray the specific plaintext that generated it, as it is "lost" in the large list of candidate plaintexts, all of which are decryption-generated from the ciphertext.

In the prevailing cryptographic methods, it is extremely difficult to match a given cipher with a plaintext of choice, thus insuring that the cipher points to the true plaintext. Security there, is hinged solely on the expected cryptanalytic effort.

Daniel also offers fine-tuned control of cryptanalytic effort, allowing it to increase above any set level—as opposed to fixed—complexity per-paintext in prevailing techniques.

Daniel offers a ready capability to string and to nest messages into a single cipher, such that different readers would be able to read only messages and part-messages intended for their attention. This "message-fusion" option, offers unlimited levels of authentication, verification, and elaboration by managing who reads what in a single cipher.

Advantageously, the present invention can stimulate free, candid documentation of private, delicate and extremely sensitive communications. Private and public-interest personal histories, which may include embarrassment, illegalities and unethical conduct, and which today do not get documented owing to fear of loss or a legal discovery process will now expectedly be committed to writing and eventually be made part of our history.

Further, the present invention can help render the Internet as a truly publicly used framework, for the full range of human activities, regardless of their level of privacy. Today, the Internet is mostly a harbor for public data. Information for which there is a restriction of users, is still, by and large, kept outside the Internet. Having one more cryptographic instrument (Daniel) will help send private and semi-private information towards the Internet. Thereby information will increase its influence on public prosperity, convenience and welfare.

Deniability per se is not novel. The association of deniability with a practical cipher is unique. The unconditionally secure cipher system known as the one-time pad, or infinite key, offers full deniability. A one-time pad cipher C may be claimed to represent any same size plaintext of choice P, by simply selecting same size key K by XOR-ing (performing bit by bit exclusive-or operation), C and P. It is the impracticality of the one-time pad that casts a shadow on any claim that it was actually used, and that K is the key to reading C. The one-time pad deniability will work only for truly random keys. Once a pseudo-random mechanism is used, the deniability is void. Daniel, by contrast, offers deniability on grounds of nominal usefulness of its paradigm. Daniel may be employed as a bona-fide crypto system, offering straight forward security, efficiency and speed. And it is this usability factor that endows the deniability feature with its intriguing attraction.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
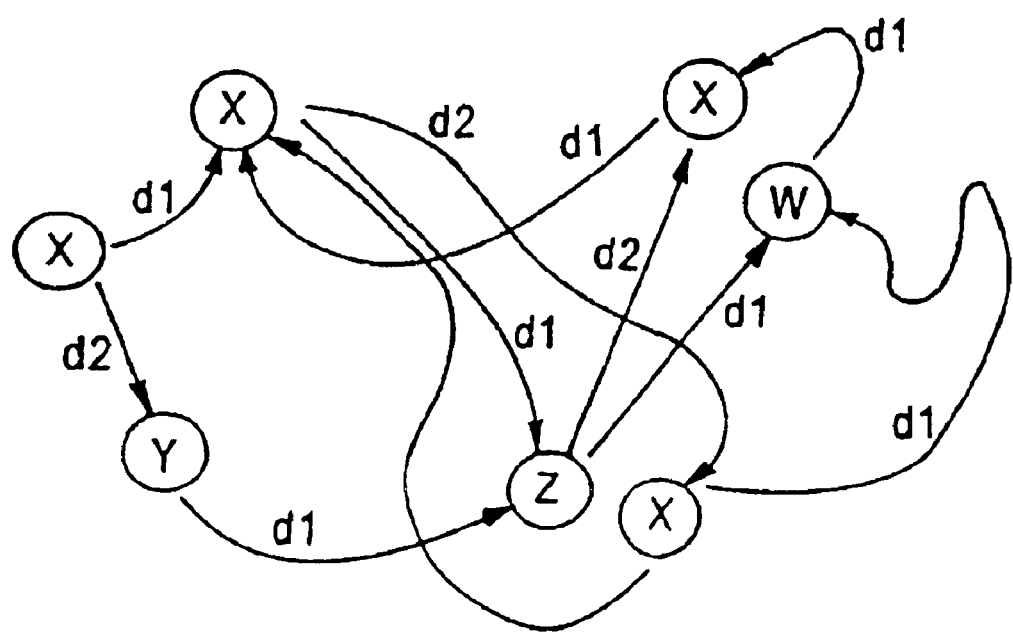
FIG. 1 is a lettered space including a set of letters elements connected with bridges.

A method and apparatus for information discovery and visualization are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions and Terminology

This section defines the fundamental terms of general cryptography followed by the specific terms used to define this invention.

Cryptography: Basic Terms And Definitions

A cryptographic system is used in an attempt to control the difficulty of understanding by changing the appearance of information.

Typically the cryptographic initiator tries to let some readers of a message to readily grasp its meaning, while forcing others to exert great effort for the same.

Accordingly a cryptographic environment features the following components:

Cryptography Manager
Cryptographic paradigm
Messages to be understood
writer
intended readers
unintended readers The cryptographic manager initiates, designs, implements and oversees the cryptographic process. The cryptographic paradigm is the abstract mathematical description of how the cryptographic activity happens.

The core cryptographic activity is comprised of:
Encryption
Decryption
Cryptanalytic Defense Encryption (also known as encipherment, encoding): changing the appearance of readily understood message (called "plaintext") so that only those designated as "intended readers" would be able to understand it. The new appearance of the information is referred to as "ciphertext".

"Plaintext" here refers to any text, and also to non-textual messages (e.g.: audio, graphics), with the term plaintext used here to honor the historic terminology of this field. Similarly for ciphertext, which is not necessarily text, but can take any other form of information.

Decryption (also known as decipherment, decoding): changing back the ciphertext into plaintext.

Cryptanalytic Defense: obstructing unintended readers from successfully undertaking the decryption action.

The messages to be understood are the input to the encryption process; they are the main object of the operation. Those messages have a writer who writes them, and they can be read by those whom the writer intended as readers, and also by others who are designated as the unintended readers. The latter should find it difficult to understand the message, the former should find it easy.

Merit of a cryptographic process, which is the sum activities of the encryption manager, writer, and readers is measured by:
1. How easy is it for the intended readers to read the message
2. How difficult is it for the unintended readers to read the message
3. How little are the adverse effects regarding inconvenience, risk of information loss, etc.
4. How small the effort to carry out the process.

Cryptography so defined was an issue, a need, and an actuality since the beginning of civilization. Formal cryptography was a shadowy arcane practice for most of its history, which led to certain peculiarities, among them a narrow conservative attitude on the high-ground of published, and declared cryptography, accompanied by a rich, scarcely documented, variety of creative cryptographic ideas.

Formal cryptography is a process in which one tries to establish, measure and assess the three merit aspects above.
Terms And Definitions Pertaining to This Invention The description of this invention incorporates the following terms:
  Raw Plaintext (Praw)
  Plain Daniel Letters (letters)—the Daniel alphabet
  Lettered Plaintext (Pl)
  Non-Repeat Lettered Plaintext (Pn)
  Expanded Plaintext (Pe)
  Letters Space (Sl)
  Countries
  Directions Letters (Ld)
  Encryption Space (Es)
  Raw Cipher (Cr)
  Production Cipher (Cp)
  Decryption Space (Dk)
  Raw Plaintext (Praw)

This term refers to the message which is to be treated with Daniel procedures. It is of any length, expressed in any language, any symbols. It may be text, or perhaps non-textual (e.g. voice, graphics). The term 'plaintext' is offered here in consistency with its generally accepted counterpart.
Plain Daniel Letters (letters)

The Daniel paradigm is hinged on a set of 1 letters:
  L1, L2, L3, . . . Ll
Which Constitute the Daniel Alphabet.
Lettered Plaintext (Pl)

This is an expression of the raw plaintext through the Daniel alphabet. It is a matter of well understood mapping procedure that allows any information to be represented through any choice alphabet, from binary (two letter alphabet) and up.

By choosing any unique procedure, the raw plaintext can be expressed as a sequence (an ordered list) of the Daniel alphabet.

This lettered plaintext is readily translated back into the original raw plaintext. No encryption per se here.

Illustration: for l=3, the letters: X, Y, Z might constitute a Daniel alphabet, and typical Letters Plaintext might look like:
  XXYZXYYYZXXYZXYXYXZYXXXZZZYX . . .
Non-Repeat lettered Plaintext The Lettered Plaintext, Pl, may include repetitions of one or more Daniel letter. This repetitive sequence may be rendered into a repetition-free (non repetitive) sequence by adding repetition-breaker in the form of an additional letter (l+1), which is to be entered between any two repetitive letters in the lettered plaintext. The result is a non repeat lettered plaintext. (Pnr)

The Pnr is readily translated back into the letter plaintext by excluding the repetition breaker letter from the sequence.

Terminology: the Daniel letters may also be called "colors", and the repetition breaker is referred to as the White color, (symbol W).

Illustration: the lettered plaintext (with repetition):
  XXXYZYYYZZZXY
Is translated into a non-repeat sequence in the form:
  XWXWXYZYWYWYZWZXY
Expanded Plaintext (Pe)

The non-repeat plaintext may be expanded by introducing repetition at will. Thereby a non-repeat sequence comprised of n letters will become a sequence comprised of m letters where m>n, or perhaps m>>n.

Since the thus expanded plaintext is based on a non-repeat sequence, there will be no ambiguity as to the reversal of the expansion to regenerate the non-repeat plaintext. Simply, all repetitions will be compressed into a single letter. Illustration: The non-repeat sequence: XWXWXYZYWYWYZW-ZXY can be expanded into:
  X X X X X X W W W W X X X X X X X W X-
    YZZZZZZZZZZZZZZZZZZZZZZZZZZZZZ ZZZZY-
    WYWY ZWZXY Note that this expanded plaintext is easily processed back into the non-repetition plaintext. It bears no cryptographic distance vis a vis the starting point (Praw). However, this cryptanalytic sheerness is unidirectional. The expanded sequence can be re-compressed without ambiguity, but the compressed (non repeat sequence) can be expanded to an infinite number of possible expansions. That means that given the non-repeat sequence, it is impossible to know, into which specific expansion it was transformed. This property will be called the "the cryptanalytic asymmetry of expansion-compression", or otherwise: "the DNL asymmetry". ("the Daniel asymmetry").
Letters Space As depicted in FIG. 1, a letters space is a set of Daniel letters (elements), including the repetition-breaker letter, the "white color". The set may be of any size (each Daniel letter may appear any number of times). Any two letters may be connected through a connection element called "a bridge". There are sufficient bridges to insure that any two letters on the letters-space can be "bridged over"—connected through a series of bridges. The series of bridges to be crossed in "walking" from one element to the other, is considered a "connecting path", or a "path" for short. The count (number) of bridges in a path is considered the "length of the path" or the distance between the two end elements, when using that path. In FIG. 1 the bridges are identified through a series of special symbols (bridge letters): d1, d2, d3, . . . such that by identifying the element and the bridge letter, the bridge is completely specified. There are other ways to identify the identity of the bridges. What matters is that the array configuration will be completely specified.

Any letters-space which complies with the above "basic attributes" is referred to as a "general letters space". In addition to these basic attributes a letters-space may be restricted by the following rule:

From each element there are at least l distinct paths, each comprised of bridges which may lead from that element to other elements of the same color (same letter), and each such (same color) path is terminated with an element of a different color.

In other words; from each element one can move through bridges to each of the other l colors (letters), through a path comprised of elements, all of which are of the color of the starting element.

A general letters space which complies with this rule will be referred to as a Daniel universal letters space, or DNL letters space.

Illustration: If the Daniel letters are: X, Y, Z (l=3), and W is the white color (letter), then from each element X in the letters-space there are three different paths of the form:

XXXXX . . . XXXY

XX . . . XXZ XXXXXXXXXXXXXXXXXXX . . . XXXXXXXXXXXW

And from each element in the letter space of color W there are three different paths of the form:

WWWWW . . . WWWWWWWWX

WWW . . . WWY

WWWWWWWWWWW . . . WWWWWWWWWZ

The respective property is called the full access property. It says that from any region of adjacent elements of the same color, there is at least a single bridge leading to each of the other l letters.

Country: country is defined as a subset of the letters-set comprised of same-color elements such that any two elements can be connected through a path that runs only through elements of the same color.

The term country is used here to signify Cayley's 4-colors terminology.

Direction Letters

If d is the largest number of bridges from any element in the letters-space, then each bridge in the letters space can be expressed through an alphabet of d letters.

D1, D2, . . . Dd with respect to the element from which the bridges project.

And accordingly any path leading from any element in the letters-space to any other element thereto, can be expressed as a sequence comprised of the d letters:

DiDjD . . . Dt where the number of direction-letters in the sequence is the distance of that path as defined above.

The Encryption Space (Es)

The encryption space is a letters-space which is used to express an expanded plaintext by its respective path on that space.

If a letters-space is constructed such that in it there are elements which are bridge-connected in a way that corresponds to the sequence of a given expanded plaintext, then that sequence can be defined by denoting the starting element in the letters-space, and then listing by order the bridges of each successive element, corresponding to the expanded plaintext. The list of bridge-identifiers (direction letters) together with the starting element will have a one-to-one correspondence with the expanded plaintext.

Raw Cipher

The list of direction letters plus the identification of the starting element in the encryption space will be denoted as the raw cipher which corresponds to the generating expanded plaintext, and backwards down to the raw plaintext. The translation of the expanded plaintext into the raw cipher is the main step which is designed to build cryptanalytic distance between any two expressions of the message in question.

By the term "cryptanalytic distance" it is meant, that the transformation from the expanded plaintext to the raw cipher is constructed in a way that is designed to make it difficult for anyone in possession of the raw cipher only to re-construct the expanded plaintext.

Production Cipher (Cp)

The raw cipher may be converted to any desirable form, which is more handy and more convenient than the raw format. Such translation is not designed to create any cryptanalytic distance. The result of this conversion is referred to as the production cipher, which is also the form that is released to public viewing, as it is expected to satisfy the object of the Daniel procedure: being readily readable and understandable for the intended readers, and not readable at all, not understood at all, for all others.

Decryption Space (Sd)

A letters space that is used to translate a raw cipher into an expanded plaintext is denoted as a decryption space. For any given raw cipher one can match a general letters space such that the designated starting element, and the sequence of identified bridges, will define a sequence of letters, which in turn may be regarded as an expanded plaintext.

Daniel (or DNL) is described here below by using terms and definitions presented in the Terms and Definitions section previously discussed.

The invention will be described as follows:

1. Conceptual Description.
2. Implementation Instances.
3. Operational Procedures.

Daniel: Conceptual Description

The Daniel environment is comprised of:

Core and

Periphery

Both the Core and the Periphery can be described according to their:

Mathematics and according to their

Process Design.

The core-periphery view of Daniel is constructed as follows:

1. Preparation (periphery)
2. Core
3. Finish (periphery)

The Daniel procedure requires a certain format for its input, and it produces a certain format for its output. The preparation phase would take any raw plaintext and prepare it to fit the format required by Daniel core. The finish phase would act on the raw-cipher produced by Daniel, and mold it towards a product cipher which is ready for public exposure. Similarly for the reverse, (decryption): the product-cipher would be prepared as a raw-cipher ready for the Daniel core, and the Daniel plaintext will then be molded to reconstruct the raw plaintext that started the operation.

The preparation and finish phases have no novelty in them per se. The preparation and finish phases will be described in brief, leaving the prime attention to the Daniel core.

Mathematical Description (Conceptual)

At its core, Daniel may be described as methods for expressing a non-repeat plaintext as sequence of bridges across a letters-space (raw ciphertext).

The purpose of this expression is to insure that it would be impossible to reverse the process without the explicit knowledge of the part of the letters-space on which the raw ciphertext is marked.

In the common cryptographic terminology, the letters-space is the "key". Unlike the common cryptographic practice, the Daniel key is infinitely variant, and thus it does not lend itself to brute force cryptanalysis, but more importantly, it lends itself to security through deniability, which is impractical with the prevailing methods.

Before explaining the previous paragraph, two extreme cases will first be discussed to help develop a sense of the issue.

The straight line key:

In the following examples the non-repeat plaintext message will be expressed through l=3 colors (letters: X, Y, Z) plus a fourth letter—the white color, W.

Consider the following non-repeat plaintext:

Pnr=WXZXWYX

There is no instance where the same letter repeats itself adjacently.

Now consider a straight-line type letters space:

S1=W-X-Z-X-W-Y-X

Where the dash ("-") sign represent bridges. In this letters space each element (except the end elements) has two bridges. We will denote the left pointing bridge as 0, and the right pointing bridge as 1, for each element. Using S1, Pnr can now be expressed as raw cipher, Cr:

Cr=111111

This is the Daniel encryption process.

Assuming the leftmost W element is taken as the starting element. Pnr guides a 'traveler' from S1 leftmost (W) element through the series of 111111 bridges for a 'trip' that corresponds to the elements sequence of Pnr. Anyone in possession of S1 will be able to reverse the transformation from Prn to Cr: reverse the encryption with a decryption process.

Albeit, anyone without the possession of S1 (the key), and only in possession of Cr, will be totally in the dark with respect to the identity of Pm. That is so even if the cryptanalyst would be aware that S1 is a straight line type letters-space, and that it encodes a non-repeat plaintext.

The dilemma before the cryptanalyst is that the key and the plaintext contain the same information. That means that the key is not an easier target than the plaintext itself. It also means that this example is impractical, since the intended reader of the message will have to have the message before it is sent—in the form of the key. Yet, this example is important because it reflects one extreme case of the Daniel cryptographic variability.

This case also illustrates the deniability aspect of Daniel. Suppose it is known that the first element in the plaintext is always W, and thus the leftmost element in the letters space is W too. The next six letters may be put together in=243 combinations. Hence the cryptanalyst in possession of the raw ciphertext (111111) will face 243 possible plaintext messages, each of which has exactly the same chance for being the true plaintext. Thus if the cryptanalysis will identify one message out of the 243, and say: that's it!—the writer, or reader of the message will be able to counter: No, that is not it, and point to any other message of the remaining 242 options.

The Basic Space

The other extreme case is based on a letters space which contains l+1 elements, and each letter appears only once. Each element has a bridge towards all other l elements, and the name of each bridge is the name of the letter of the element which the bridge leads to. This configuration is referred to as the basic space.

In the l=3 case above, the following arrangement qualifies as a basic letters space: (Sb).

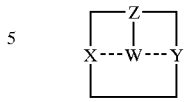

The lines signify bridges. Using the basic space as key, the encryption of the above Pnr=WXZXWYX, will yield the raw cipher:

Cr=xzxwyx

Where the lower case letters represent the bridges names. Since it is assumed that the plaintext string begins at the W element in the basic space then Cr, the raw cipher looks exactly like its corresponding plaintext. This is the trivial case, where there is no security at all. A cryptanalyst who is aware that the basic space is being used, will simply read the plaintext in the raw cipher. The two cases presented above mark the two extreme situations with respect to Daniel: in the straight line case, the key (the space) contains the full extent of the plaintext information, and thus it offers complete security, if it remains unknown to the cryptanalyst. In the basic space case, the full extent of the plaintext information is carried in the cipher, and thus offering virtually no security versus a cryptanalyst in possession of Cr.

Note that the straight line case is good only for the shown message. By contrast the basic space is applicable for any message of any size.

These two extreme cases are both impractical. In the working cases, the plaintext information is divided between the key and the cipher, and therein lies the security of the Daniel approach.

To be practical one would use the universal Daniel letters space, as defined in the Terms and Definitions section above.

In essence any universal space can map any non-repeat plaintext into a corresponding raw cipher. Unlike the prevailing methods in which the key is well defined in size and form, the Daniel key—the universal space—offers unprecedented variability in size and form.

First, the preceding paragraph will be proven, then discussed.

The universal Daniel letters-space is a set of letter-elements (also referred 10 to as colors), connected with a series of "bridges" so that the space complies with the full access rule. Namely from every element (starting element) on that space one could reach any of the remaining l colors by going though a, path (a sequence of bridges), all comprised of elements of the same color (same letter), as the starting element.

The non-repeat plaintext may be interpreted as a sequence of letter pairs: i,j, such that i≠j. Starting at any element i on the universal letter space, it would be possible to bridge over directly to an element of color j, or bridge over to a j-element through a series of k elements of color i. So much is assured by the full-access rule.

Anyone aware of the identity of the starting i element, and given the series of crossed bridges (the raw cipher), will be able to make a list of the stepped-through elements of the letters space:

$i, i, \ldots i, j$

← $k$ times →

Since it is known that the input consisted of a non-repeat plaintext, the reader would be able to discount the added k elements of color i, and recompress the sequence to the original:

i,j pair.

Such compression is offered only to a reader in possession of the letters-space. Without that space (the key), it would be impossible to know that the k i-color elements are superfluous.

Once it is agreed, for instance, that each non-repeat plaintext will begin, say, with X, and it would be known which X element in the letters space corresponds to that starting element, then the full-access rule, will insure that the letters-space would be able to map, the non-repeat plaintext into a bridge-sequence (raw cipher), in a way which is completely reversible for anyone holding the cipher and the key (the letters space).

This is so regardless of the length of the non-repeat plaintext, and regardless of the size, the shape and the form of the universal letters space (the key). Namely the plaintext may be small, while the key is large, or conversely: the mEssage is long and the key is very small, (or any other combination). Note that the basic letters space defined above is the smallest size universal space. But there is no largest size. There is an infinite number of universal spaces. This means that even theoretically, even with the fastest computers yet to be built, it is impossible to guarantee a successful cryptanalytic effort, regardless of how much computing time, or power is available.

The expansion property allows for the ciphertext to be as large as desired, for a given message size, which in turn means that the size of the key which is actually employed in the encryption may also be as large as desired, adding as much security as needed.

This distinction with respect to the prevailing encryption methods is significant. The latter must rely on the assumption that a cryptanalyst has no more computing power, and no additional mathematical insight than is suspected by the encryption builder.

The Daniel encryption maps a non-repeat plaintext to its raw cipher by actually mapping its corresponding expanded-plaintext (as defined in the Terms and Definition section). The expanded plaintext may be of the same size as the non-repeat plaintext or of a much larger size. The holder of the raw cipher only, will not know how small the actual message is. This is again in contrast with the prevailing methodologies where the size of the cipher betrays the size of the plaintext.

The Daniel procedure derives its name from the ready way by which a given raw cipher may be matched with any plaintext of choice, provided its size is no larger than the size of the cipher. (it may be smaller).

This ready matching will be explained below, then discussed:

Given a raw-cipher, Cr, comprised of b identified "bridges", and given a non-repeat plaintext, Pnr, of size a, (where a is the number of letters in the non repeat plaintext). For any a<=b, one may wish to construct a letters-space S (key), such that:

$$Cr=C(Pnr,S)$$

Namely that S will map Pnr to Cr.

This construction may proceed as follows:

Step 1: expand the non-repeat plaintext to an expanded plaintext of size b. Use any expansion of choice.

Thus, if the bridges are identified through bridge-symbols (direction letters):

Cr=D1, D2, . . . Db and for a<b, the non-repeat plaintext is defined as;

Pnr=L1,L2, . . . La

Where L1,L2, . . . etc. are the letters that comprise the non repeat plaintext then the expanded plaintext will look like:

Pe=L1,L2,L2, . . . L2,L3,L4 . . . La

Such that the letter count in Pe will be b letters. Of course, one could repeat letter L3, or L1, or L54, or any combination thereof, as long as the total count of letters is equal to b. Either version of the expanded plaintext will be readily compressed to Pnr, by virtue of the non-repeat attribute of Pnr.

Step 2: Construct the path-portion of the letters space S, as follows:

Define an element in the space by the color L1. Build a bridge marked D1 from L1 to the next letter in Pe (L2 in the above, example). From that element (the second) build a bridge marked D2 and let it lead to the third element in Pe. Keep this process of bridge building and element placing, step by step, until all bridges in Cr have been used up, and at that time, all the elements in Pe have been used up (the expansion matched the count of bridges with the count of elements). The resulting structure is a letters space which matches the raw cipher with the expanded plaintext, and in turn with the non-repeat plaintext, which was the target of this construction.

Once the above described space has been built, it may be further built by adding bridges and elements from any existing element to build a larger, perhaps a much larger letters space. Each of those constructions will amount to a letters space ( a key) that would match the cipher with the given plaintext.

This straight forward construction can be viewed in contrast with the extreme difficulty to do the same with any of today's prevailing cryptographic systems.

It is the terrific variability of the Daniel key that endows it with this important advantage. If a cipher can be readily matched with a plaintext of choice, then it can not really singularly point to the single message that in fact generated it.

By way of analogy: if an airport locker key is found on one's person, then it may be rather difficult to find the corresponding lock (if the number and other marks are scratched off). But once found, the contents of that locker will implicate the key-holder, if its contents is incriminating. However, if the key is found to fit 10, 50, or a thousand lockers, and one of them has incriminating content, then, there must be lingering doubt, whether that is the contents that belongs to the identified key holder. So by opening more locks than one, that key offers a new kind of security: deniability.

A message writer will be able to expand its original message to any size of choice, creating a cipher as large as desired. And for a cipher of size b, (b bridges), the possible messages that can be easily matched to it (given a proper space) is:

$$1^{(b-1)}+1^{(b-2)}+\ldots 1$$

where 1 is the size of the Daniel alphabet. This is the count of all non-repeat combinations of size b, or smaller, given 1 colors (plus white).

Since the writer can make b as large as desired (expand without any preset limit), he or she can also 'drown' their true message in a large as desired field of possible messages, each of which must be taken with equal likelihood by a cryptanalyst who only holds the cipher—not the key.

Note: this equal likelihood statement is so in theory. In practice, a cryptanalyst might use historic pattern and auxiliary information to render a few key options as more likely than others. But even though, the intrinsic option to match any plaintext with a given cipher will deny the cryptanalyst the power to prove his or her finding. (Which in many instances is all that is needed).

Another significant attribute of Daniel is its natural ability to offer many levels of nesting and compounding.

Compounding in this context will be defined as a configuration in which two readers of a cipher C will be able to read a common section C0, but reader 1, will be able to read portion C1 of the cipher, and not portion C2, and reader 2, will be able to read portion C2 but not C1.

Where:

$$C=C0+C1+C2$$

Nesting in this context will be defined as a configuration in which two readers of a cipher C, will be able to read in it a first level message. P0, but only reader-1, will be able to read an additional message P1.

In compounding the two readers are aware that the other can read a portion which they can not. In nesting the reader who deciphers C into P0, might not be aware that the other reader reads P0 and an additional message P1.

Of course, these definitions extend to the case of n readers (n>2).

Compounding and Nesting are of great importance in situations where authentication and secrecy management are of prime importance.

The following will describe how Daniel lends itself to both compounding and nesting.

Compounding with Daniel:

Let D1,D2, . . . Dd be the standard d symbols which identify up to d bridges from any element in a given letters space S0. Now suppose that a particular element X in S0 is associated with a bridge marked as D(d+1). D(d+1) will not be identified as meaningful by a cipher reader who is familiar only with D1,D2, . . . Dd. We may agree that a cipher reader who encounters a bridge which does not make sense to it, will ignore that bridge and consequently ignore the rest of the cipher, since that reader will have no way to decipher it.

A second reader might have been made aware of the new type bridges, and thus continue to read the cipher beyond the point where the first reader stopped. That reader will have to have another space section, S1, extending from S0, that will allow him to interpret the full cipher. A third reader might also be made aware of the D(d+1) bridge, but he could have been given another space section S2, which will lead him to interpret the extended section differently from the former. Each of the two last readers may be aware that the other reads in the same cipher a different message, using in part a different key.

Nesting with Daniel:

Nesting may be carried out with the concept of shades.

Recalling the color connotation of the Daniel symbols, one may define several shades for each color. The shades may be visible to one, but not to the other.

Thus in the case of l=3, where X,Y,Z are the color symbols, and white is extra, a given space might look like:

```
W---X---X---X---Y---Y---Z
        |
        X---W
``` to one reader, and to another reader look like:

```
W---X1--X2--X3--Y---Y---Z
        |
        X4--W
```

Where X1,X2,X3,X4 are distinct shades of X (different symbols), which in turn may be assigned as follows:

X1=W'
X2=X'
X3=Y'
X4=Z'

Now suppose that a given raw cipher is defined by staring at the leftmost W element and then proceeding along the straight line to X1, X2, X3, Y, Y and then Z. The first reader who is blind to the shades of X will decipher the raw cipher into the expanded plaintext:

Pe=WXYXYYZ and from there into the non-repeat plaintext:

Pnr=WXYZ

The second reader will do the same (reading once while ignoring the shades of X), but then will be able to reinterpret the same as:

WX1X2X3YYZ and then interpret the X1X2X3 section as:

P=W'X'Y' and thus see in the same cipher a deeper message which the first reader has not even suspected that it is there.

Of course, this nesting situation, may occur again into a deeper level. It depends on how much expansion is there in the original message. Nesting exploits the expansion attribute of the Daniel procedure.

The expansion option on the non-repeat cipher offers a built in security booster as elaborated below:

Fine-Tuned Security

Security is determined by the expected effort for cryptanalysis. With Daniel it is readily possible to add confusion against these efforts by introducing as much expansion as one desires. The message writer can add expansion without pre-consulting with the intended reader. That is the advantage of the non-repeat attribute of the input plaintext: it allows a reader to recompress an expanded plaintext regardless of how much compression is needed. There is never a confusion in that process: every repetition of symbols is to be eliminated. Yet, the fact that the expanded plaintext features many repetitions is not visible to the cryptanalyst who sees only the ciphertext. The repetitions are only visible to one looking at the letters space (the key). Accordingly the message writer can increase the confusion (the security) of a very specific portion of the plaintext (where the text contains a specially sensitive piece of information), by adding repetition—expansion—at that location, and not in others. This fine tune control is absent in the prevailing cryptographic systems.

The Advantage of Large Countries:

By constructing a letters space with large countries, it is easy for the encryption engineer to hide a great deal of information in its cipher. Large countries allow for massive blowout of the plaintext into a large ciphertext. This is done through the above mentioned expansion process. The expansion sequence can then be used for various purposes.

If the non-repeat sequence is:
XYXZYXWX
and the corresponding expansion is
X X X X X X X X -
YYYYYYYYYYYYYXXXXXXXXXXZZZZZ
ZZZZZZZZ ZYYYYYYYYYYYYYYYXXXXXX-
WWWWWWXXXXX Then the superfluous elements can be used to create false impressions to throw off a cryptanalyst, or they may be used through the concept of shadows to signify a deeper message to some but not all of the intended readers.

Key Variability: The Critical Advantage

The prevailing cryptographic methods may be implemented with keys that are fixed in shape ( a binary string), and fixed in size per implementation. Their size can change, but not without serious changes to the working algorithms. And when the key size increases, the overhead increases more than proportionally. The price of increased security is thus rather high. This is in part because both the prevailing cryptographic methods (symmetric and asymmetric) are block oriented. A relatively small, fixed size block is being processed one at a time. And so any increase in key size affects the encryption of each and every block (and the respective decryption too). With Daniel the shape of the key is undetermined, neither is its size. And when the key increases its size, it has no impact on the encryption computation, as it does with the prevailing tools. This is because Daniel is a stream cipher: it treats a plaintext stream as a unit, not as a sequence of blocks. Key variability allows for nesting, and for the deniability feature.

In summary: Daniel core is a procedure for expressing a non-repeat plaintext as a cipher: a sequence of symbols which define a path on a set of elements referred to as the letters-space or "key". The procedure allows for easy matching between a given cipher and a plaintext of choice, which is the basis of its namesake, Daniel (a cryptic variant of Denial). The Daniel key is selected from an infinity of choices, which is the foundation of its deniability and its fine tuned controlled security, as well as its compounding and nesting attributes.

Process Design

From a computer process designer point of view, Daniel is a procedure which lends itself to software implementation, to hardware implementation, or a combination thereof. The detailed design will depend on a long list of factors and parameters which will have to be developed before the design itself. Without such elaboration, the designer will have to limit himself or herself to functional description, and general outline. The following section will offer such an outline, and then offer some general design considerations for choice of implementation specifics.

Figure 2:
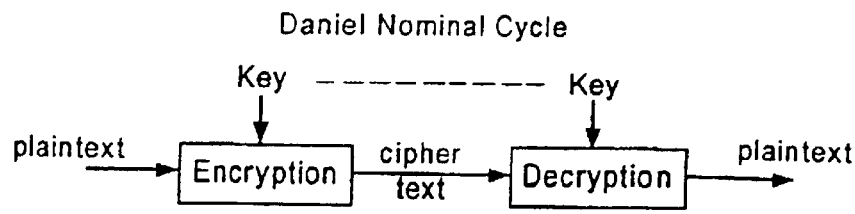
FIG. 2 is an illustration of the Daniel nominal cycle.

Daniel's nominal cycle is captured in FIG. 2. The plaintext is processed with the help of the letters-space (the key) to produce the ciphertext (the encryption stage). The secure ciphertext is subsequently processed via the same key to reproduce the plaintext (the decryption stage).

Figure 3:
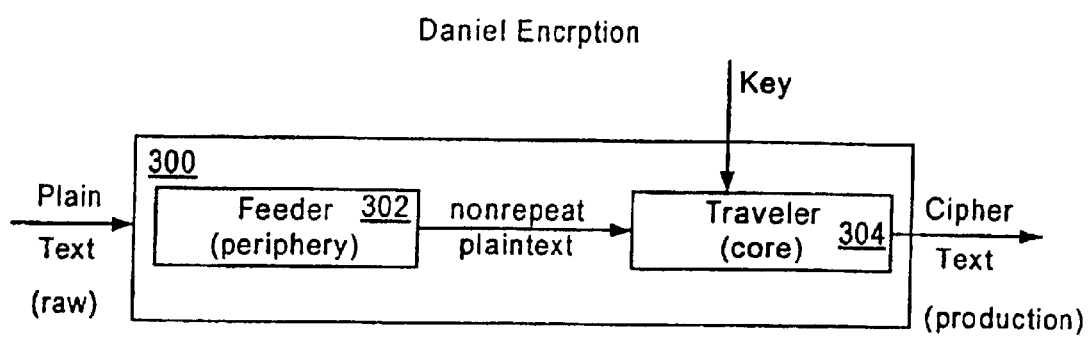
FIG. 3 is an illustration of the Daniel encryption stage.
Figure 4:
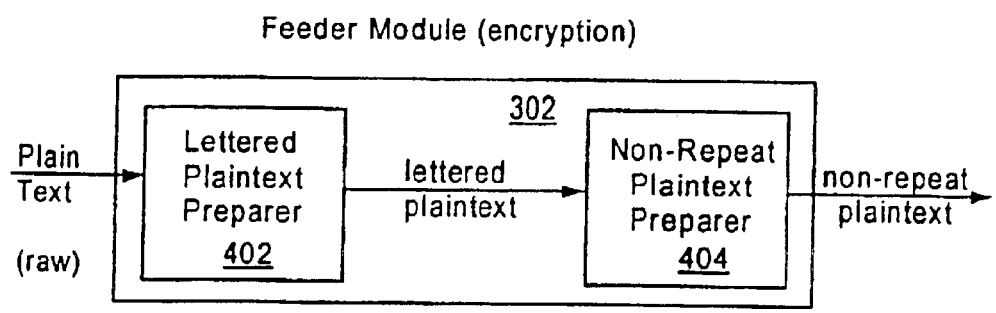
FIG. 4 is an illustration of a feeder module (encryption)

Daniel's Encryption Stage 300 is shown in FIG. 3 and is comprised of two main modules: The Feeder (periphery) 302, and the Traveler (core) 304. The former takes in the plaintext in its raw form and prepares a corresponding non-repeat plaintext to be fed into the Traveler Module, which constructs the "path" which constitutes the cipher.

The Feeder Module 302 prepares the raw plaintext into the format expected by Daniel's core (the Traveler module) 304. This is done in two stages: first the raw plaintext is converted into a Daniel-lettered-plaintext 402, which in turn is processed into the non-repeat plaintext 404. The complexity of the first component (The Lettered Plaintext Preparer) depends on the form of the raw plaintext. If it is a nominal text stream, it leads to a simple conversion. If the raw text is a picture, or an audio stream, the process is a bit more involved. Albeit, binary representation of all forms of data is commonplace, and a binary sequence can easily be converted into a Daniel's letters sequence.

Figure 5:
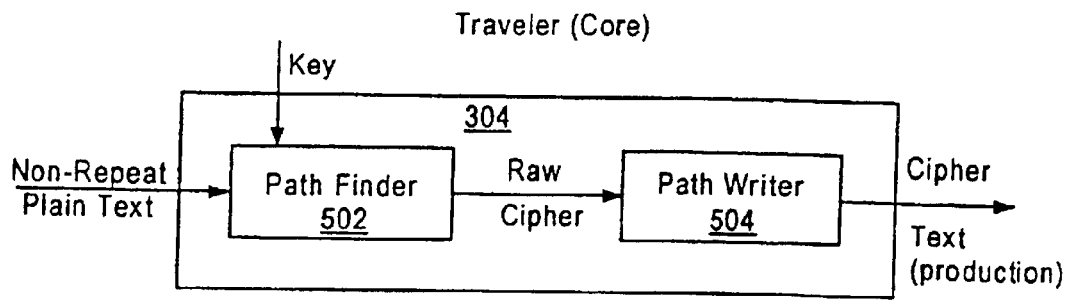
FIG. 5 is an illustration of the traveler (core)

The Traveler 304 is depicted in greater detail in FIG. 5 is the core 304 component of the Encryption process as depicted in FIG. 5. It is the component in which the cryptanalytic distance is created in defense of the plaintext. This module derives its name from the nature of Daniel: the ciphertext is created by delineating a path 502 on the Daniel letters-space (the key). The path is dictated by the plaintext in its non-repeat format. The Path Writer 504 takes in the raw cipher which is a sequence of the direction letters (the path), and translates them to the final form, depending on the implementation. One common format is straight binary, represented through the 256 extended ASCII symbols (00-FF). This format may pose some inconvenience as it includes characters which various software would interpret as control characters, like 'new line', or a 'new page'. To avoid this, one could translate the raw cipher to be expressed in a somewhat longer sequence which will feature only the 128 printable characters, or even a longer one that would include only familiar alphanumeric characters. At any rate no cryptanalytic gap is being created at that stage.

Figure 6:
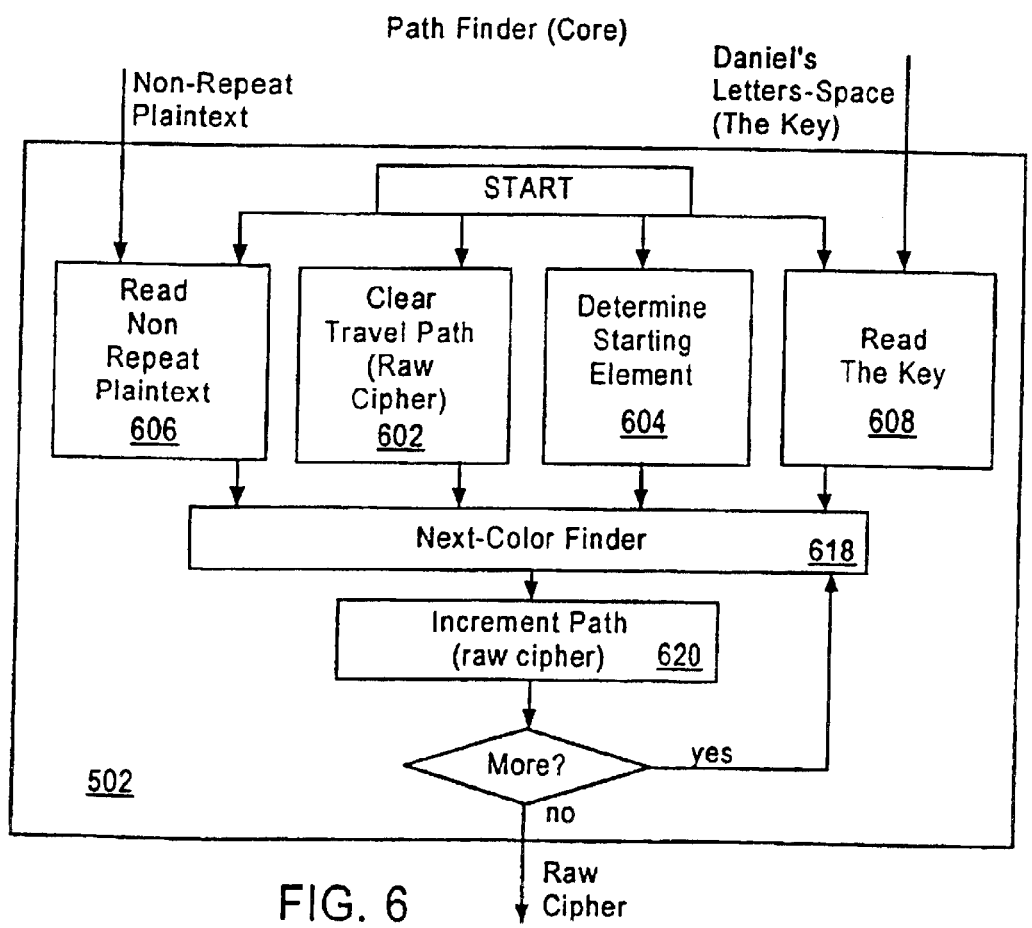
FIG. 6 is an illustration of the path finder (core)

The Path Finder (Core) 502 is depicted in FIG. 6. This Module 502 builds the cipher. It reads in the ready plaintext 606 (the non-repeat format), and the key 608 (the letters space), and then this module 600 performs preparatory steps: it clears the former path 620 (to build a new one), and it determines which is the starting element within the key for the path to commence 604. The starting element may be built as default into the software, or alternatively, it may be a separate input. One implementation route is based on using a very large key. If the key is large enough, it can conceivably bepublished in the open, allowing the starting element to become the "sub-key" which is the part which remains secret. Alternatively, the large key can be restricted to a user community, and different communication partners use the same key, but applying a different starting element. In general, the larger the key, the more security there is in hiding the starting element. Albeit, a published large key eliminates the deniability feature.

Once these preparatory actions have been taken, the process may invoke the Next Country Finder algorithm 618. This is the part which determines the path from the current element to an element of the target color (which is different from the current color, as marked on the "travel guide", the plaintext, is in its non-repeat format). The path section from the current element in the letters space to the element of the target color is referred to as the increment path 620. It may be a path of distance one (when the current element has a neighbor with the target color), or it may be of any length, depending on how many steps the "space traveler" will make through elements of the current color. Note that these steps are equivalent to the expansion process of the non-repeat plaintext. If nesting is employed then the same-color travel may be extensive because another reader will decipher in this path section a deeper message which the "plain reader" will not be privy to. Once the path increment is determined, it is being added to the path that accumulated from the start of the process. If there are no more letters on the non-repeat plaintext sequence, then this is the end of the-path, or the complete raw cipher. Otherwise, the next-color finder is re-invoked with respect to the next letter on the non-repeat sequence. The result is a full translation of the plaintext into the raw cipher.

Figure 7:
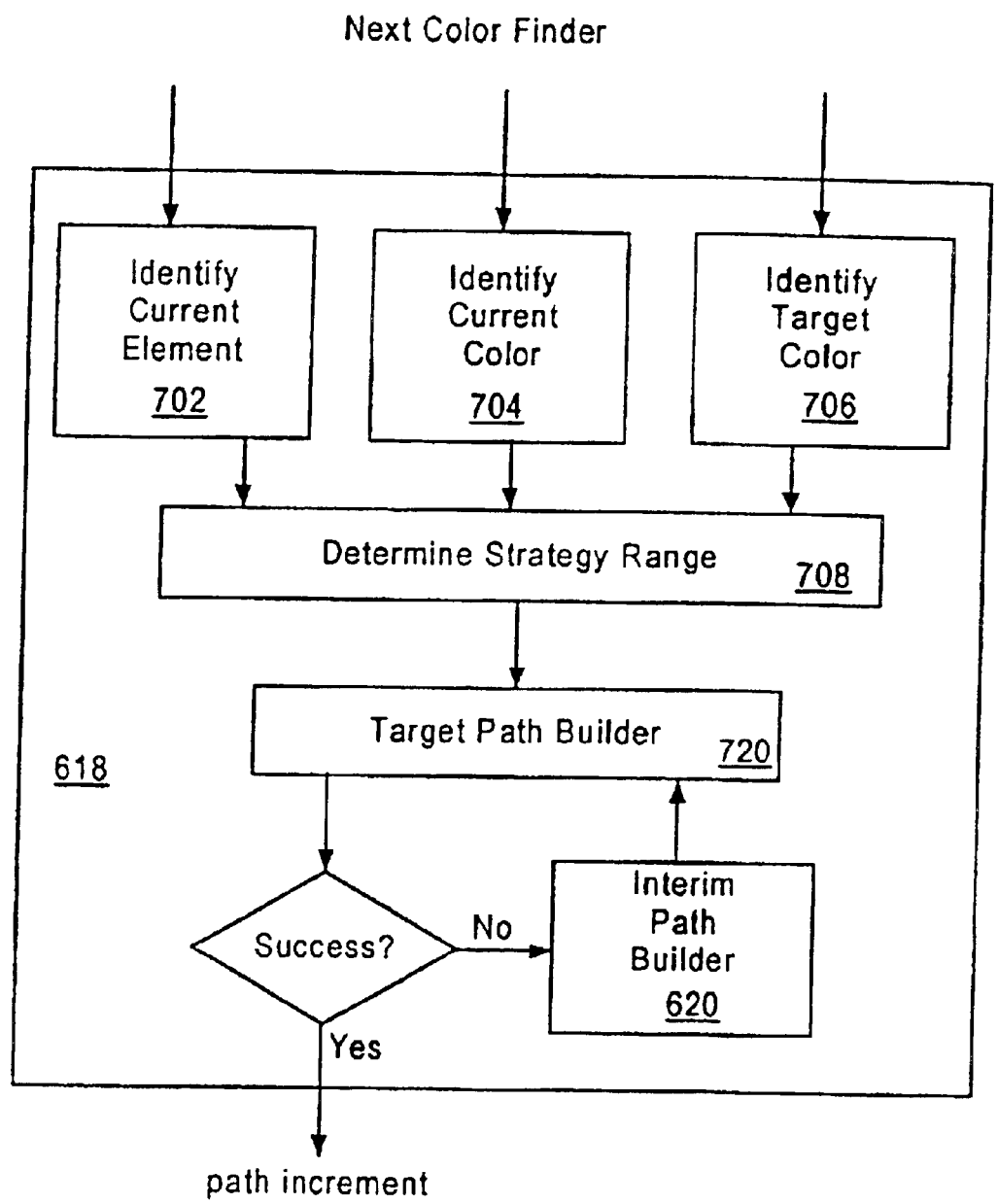
FIG. 7 is a flow diagram of the next color finder.

The Next-Color Finder (core) 618 is depicted in greater detail in FIG. 7. The robustness and usability of Daniel is hinged on the quality of this module. The raw cipher is essentially a path leading from one element in the letters space to another. The path is comprised of the non-repeat sequence interlaced with various repetitions. It is desired that: the repetitions and the true color-changes will not be distinguished by the cryptanalyst. Thus the Next-Color Finder module 618 will try to draw same-color path sections in a way that would not distinguish it from the color changes. Also, this core step must be performed efficiently, without much delay, to reduce the overhead posed by the encryption as a whole. The input to Next Color Finder (NCF) is simple: the current element 702, its color 704, and the target-color 706. The module has to determine a path from the current element (on the letters space) to another element of the target color. To do that it is necessary to determine a strategy range.

The Strategy Range 710 is depicted in FIG. 7. The two extreme cases for strategy options are: (1) full space visibility, and (2) one-step visibility. In the former case the algorithm that would determine the path increment would consider the full configuration of the letters space. Since the space can be very large; this strategy may consume a great deal of computing resources. The trade off is the chance for an optimal path (very hard to crack). In the latter case, the logic would operate only on the identity of the immediate neighbors of the current element. Based on such poor visibility, the next element will be selected, and become the current element. From there the process will repeat itself. In between these two extremes lies the range of incorporating a growing range of elements around the current element. If the strategy will look at all elements which are at distance d from the current element, and if the number of bridges from each element is at most, b, then the maximum number of elements for consideration will be bd. Another possible range criteria is the country limit. The algorithm could look at all the elements of the same color which are part of an uninterrupted area (without being 'stained' by other colors). Such country-wide view, is especially desirable for nesting implementations.

Once the strategy has been determined this (NCF) module 618, will attempt to build the increment path from the current element to an element of the target color. If successful, then the module has finished. If not, then the module 618 would invoke the Interim Path builder 620 which will change the current element to another one of the same color. It would mark an interim path and will then lead into re-invocation of the Target Path Builder, to try again. This cycle should be programmed:with care to insure that it does not recycle endlessly. Note that the full-access property of the universal Daniel letters space would guarantee that such endless cycle can always be avoided. The likelihood of such recycling is higher for poor visibility strategy (see above). The full-visibility case should never invoke the Interim Path Builder 620. The one-step visibility case, is likely to invoke it quite often. Also, the larger the countries, the higher the chance for interim path recycling. The trade off here is as follows: increased visibility strategy involves high up-front overhead, but few, recyclings (which are another form of overhead). The poor visibility case is faster up-front, but may succumb to overall slow processing by resorting too often to the recycling remedy.

Figure 8:
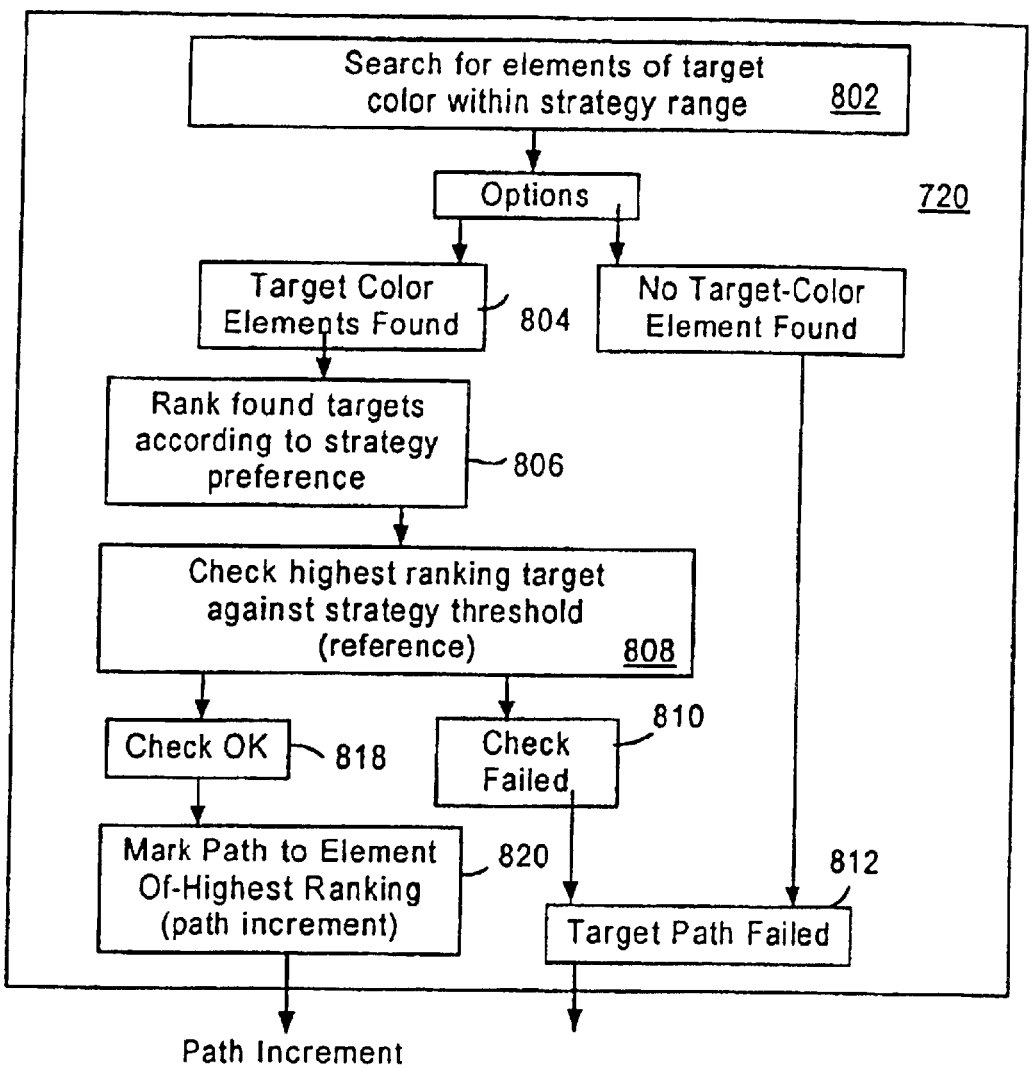
FIG. 8 is a flow diagram of the target path builder.

The Target Path Builder (core) 720 is depicted in greater detail in FIG. 8. This internal module 720 builds the path stretch that leads from the current element to the target element. A stretch that may be one bridge long, or any large number of bridges long. The action begins with a survey of the strategy range 802 (see above), to check how many target-color elements are visible within the range. If none, then this module bows out—it failed. If there is one or more 804 then there is a question of which one would become the target element, if any 806. The answer to this question is given in the details of the selected strategy. There maybe numerous considerations. It may be that an element that was visited earlier in the path history, is less (or perhaps more) attractive than others. It may be that an element which is part of a large, rather than small country is a better choice than others. A larger country will allow for nesting, and in general greater degree of expansion. In other words, the selection strategy will be expressed as a set of rules in the logic of the implementation. Based on these rules each identified target color element will be ranked for its preference 808. If none exceeds what the rules say is a minimum preference, then the module would fail 810 and exit with a failure flag 812. Otherwise, the element with the highest ranking will be the one to move to 818, and the module would mark a path from the current element to the selected target. The marked path 820 will become the output of this module.

Figure 9:
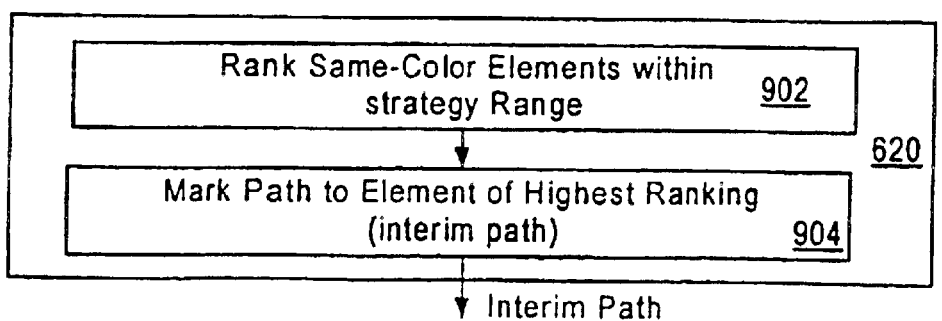
FIG. 9 is an illustration of the interim path builder.

The Interim Path Builder 620 is depicted in greater detail in FIG. 9. The task for this module is to move the current element to another element of the same, color so that the Target Path Builder 720 can try again. To do that it is designed that all the same-color elements within the strategy range will be ranked for preference 902, and the one with the highest ranking will be the one to move to (marking the interim path to it) 904. Note that the full access property guarantees that once this module is invoked, it would necessarily find at least one same-color element to move to (through other same-color elements, if necessary). In other words there will always be an element to go to, (unlike the case with the Target Path Builder). The preference ranking should be influenced by the history of the path search. There is no point in re-invoking the Target Path Builder with a current element which was tried before (and resulted in failure).

Figure 10:
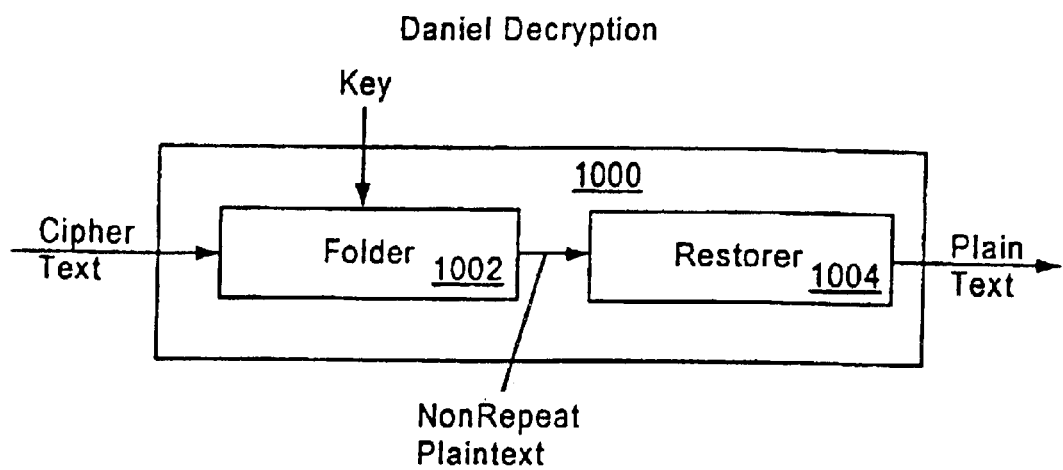
FIG. 10 is a high level block diagram of Daniel decryption.
Figure 11:
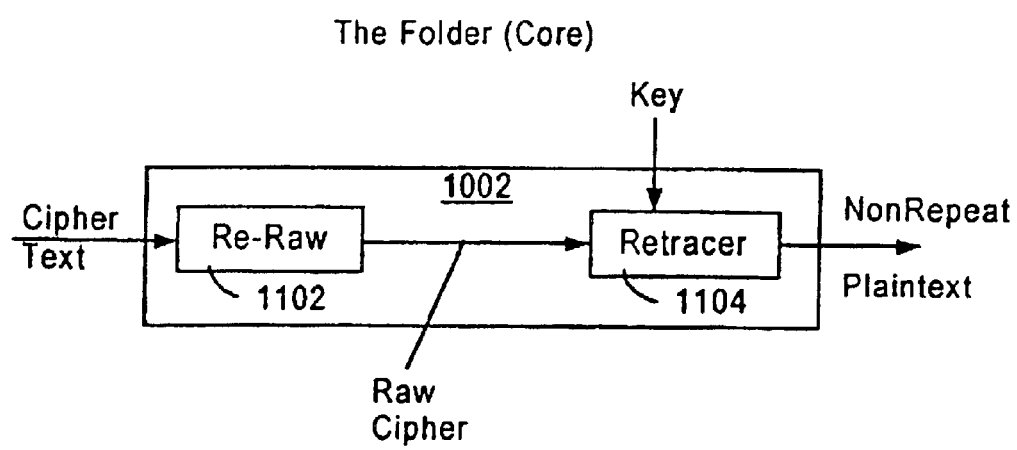
FIG. 11 is a high level illustration of the folder (core)
Figure 12:
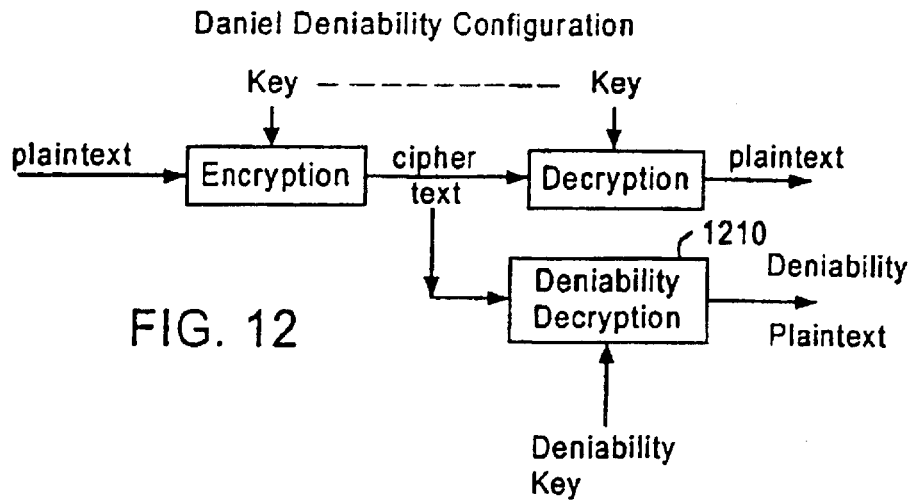
FIG. 12 is an illustration of Daniel deniability configuration.
Figure 13:
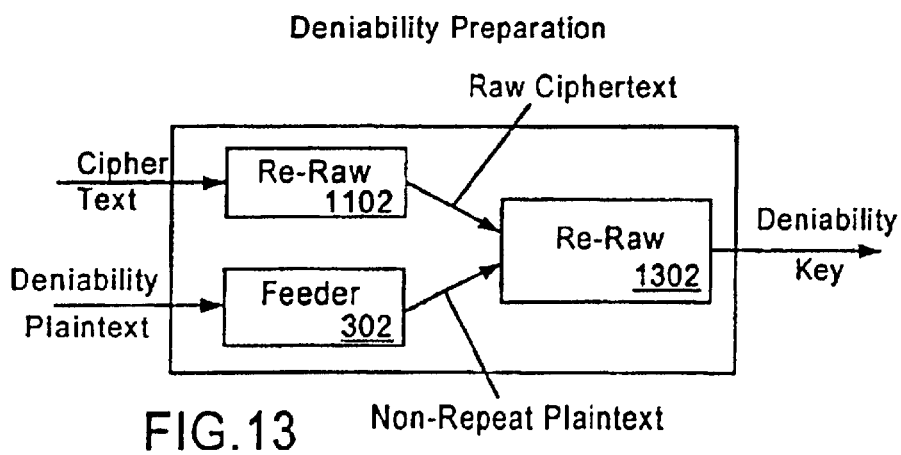
FIG. 13 is an illustration of deniability preparation.
Figure 14:
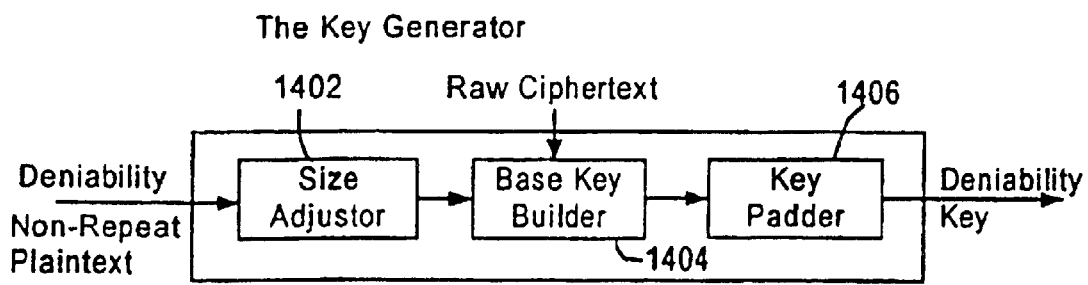
FIG. 14 is an illustration of the key generator.

Daniel Decryption 1000 is depicted in FIG. 10. This is the reverse-encryption process. When it is done, the original (raw) plaintext is reproduced, as if neither encryption, nor decryption ever occurred. The process itself, though, is far simpler and faster since it does not involve the strategy considerations which transpire in the encryption stage. The decryption stage is comprised of two basic modules: the Folder, and the Restorer. The production ciphertext is fed into the Folder module which folds it back to the non-repeat plaintext (that served as the cipher generator in the encryption stage). The non-repeat plaintext is then restored to its original form (raw) in the subsequent module. By using the same key which was employed in the encryption stage, it is mathematically assured that the resulting plaintext will be identical to the input that started the encryption process.

The Folder (Core): This module is comprised of two parts: the first, Re-Raw, reconstructs the raw cipher from the production version. This is a simple table which is essentially the reverse action of the Path Writer module in the encryption stage. It has no cryptanalytic value. The result is a sequence of the direction-letters which corresponds to the cipher path from its starting point towards its end point. The raw cipher is then fed into the Retracer module. Unlike its encryption equivalent, the Retracer process is straight forward, and is not encumbered with strategy decisions. The Non-Repeat plaintext is generated letter by letter through following the direction-letters of the raw cipher. Each direction letter points to an element of the letters-space. If the color of that letter is the same as the color of the previous letter (where the bridge originated) then it is ignored, and the next direction letter is being read. If the color is different, then the new color is being added to the growing sequence of the Non-Repeat plaintext. When this module finishes to walk over the letters-space through the sequence of direction-letters, the accumulating element-list constitutes the Non-Repeat plaintext.

Deniability Processing

In order to activate Daniel's deniability feature, it is necessary to first complete the Deniability Preparation. The result of this preparation will be a deniability-key (d-Key), which when used in conjunction with Daniel's Decryption sequence, will produce the deniability plaintext. It is the responsibility of the deniability-user to prepare a plausible deniability plaintext, in case the deniability protection is ever to be used. The deniability user will have to keep the d-Key handy, ready to be challenged.

Deniability Preparation: The deniability preparation is a process which takes in a Daniel ciphertext, and deniability plaintext, and generates the deniability key as an output. It is comprised of three modules. The first two were introduced above, and are used in the nominal Daniel process. These are the Re-Raw module and the Feeder. They take in the ciphertext and the Deniability plaintext respectively, and produce the rawcipher and the non-repeat deniability plaintext. The latter two data pieces are fed into the third module, which is the core of the deniability preparation: the key generator. There is where the key is generated.

The Key Generator (core): This module is comprised of three parts. The, first is the Size Adjustor, which expands the deniability non-repeat plaintext to be as long as the raw-cipher. (Recall, that the deniability procedure requires the ciphertext to be as long or longer than the deniability plaintext). The second part is the Base-Key Builder. This is the core module which builds the part of the key which creates the match between the deniability plaintext and the given cipher. It's output is partial key (letters space), which is then fed into the Key Padder where more elements are added to create an overall key that should pass for a "real key" that purportedly was used in encrypting the given cipher. The size adjustment is based on adding repeat letters at will. The Base Key Builder is straight forward. The process begins with placing the starting element as the first element of the deniability letters space. Then the next element is constructed by setting a bridge named as the first bridge in the raw ciphertext, and terminating it with an element of the color indicated by the second letter in the expanded deniability plaintext. Similarly, the n-th element in the base-deniability key is constructed by, setting up a bridge named after the n-th bridge in the raw ciphertext, and terminating it with an element of the color indicated by the n-th letter in the deniability expanded plaintext. When the process is complete the base-deniability key features as many elements as the ciphertext, and when it is used in the nominal Daniel decryption process it will yield the deniability raw plaintext. The Padder module is subsequently invoked to add as many elements as desired around the base part, and thus allow the deniability key to look like a nominal working Daniel key.

Implementation Instances

Daniel is a broadly defined cryptographic paradigm. One may reduce it to a specific implementation in many useful ways. The following are some options.

A Minimum color implementation
The Cayley's 4-color map implementation of Daniel.
Hardware Implementation Minimum Colors Implementation While there is no maximum number of colors for Daniel implementation, there is a minimum of l=2. The smallest size alphabet for expression of information is binary: 0,1. (l=2). In order to break apart the repetition, one needs a third symbol (the white color), making a total of three colors minimum.

Cayley's 4-color Man Implementation of Daniel

This implementation will be introduced by first reducing the definitions of the basic constructs of Daniel to this specific case, and then outlining the operational mathematics of this implementation.

Defining the Daniel constructs for Cayley's implementation instance:

The following constructs will be defined:
Raw Plaintext (Praw)
Plaintext Daniel Letters (letters)—the Daniel alphabet
Lettered Plaintext (Pl)
Non-Repeat Lettered Plaintext (Pn)
Expanded Plaintext (Pe)
Letters Space (Sl)
Directions Letters (Ld)
Encryption Space (Es)
Raw Cipher (Cr)
Product Cipher (Cp)
Decryption Space (Dk)

Raw Plaintext (Praw)

In this illustration the raw text will be limited to the 26 letters of the English alphabet. All letters will be considered upper case, and the only non-letter symbol allowed will be the space indication. Thus the raw text for this example is comprised of 27 symbols.

Note that this limited version can in fact express numbers, punctuation marks, etc, by simply spelling them out.

Examples of raw plaintexts:.

[a] I LOVE LUCY
[b] THE TREASURE IS BURIED SIXTY FEET NORTH OFF THE BIG OAK TREE
[c] THIS IS A VERY SECRET MESSAGE

The Daniel Cayley's Case alphabet: Three letters, colors (l=3), will be used in this implementation, denoted as:

X, Y, X and to which W, the white color , will be added: X, Y, Z, W.

The Lettered Plaintext: The raw plaintext, defined through the 26 letters alphabet of the English language may be mapped into the Daniel case alphabet in various ways. The following is one such choice:

| English letter | Daniel lettered-equivalent |
|---|---|
| A | YZY |
| B | YZZ |
| C | ZYZ |
| D | ZXZ |
| E | XYX |
| F | XXZ |
| G | YYZ |
| H | XXY |
| I | YXY |
| J | YYY |
| K | ZZX |
| L | ZYX |
| M | ZXX |

-continued

| English letter | Daniel lettered-equivalent |
|---|---|
| N | YXZ |
| O | YZX |
| P | XYY |
| Q | ZZY |
| R | XZY |
| S | ZXY |
| T | XZX |
| U | YXX |
| V | ZYY |
| W | XZZ |
| X | ZZZ |
| Y | YYX |
| Z | XXX |
| space | XYZ |

The above table will facilitate a unique translation of any raw plaintext into the Daniel lettered plaintext.

The three samples above (given in raw plaintext) will be rendered into: (By convention every line will start with a space).

[a] XYZYXYXYZZYXYZXZYYXYXXYZZYX-YXXZYZYYX

[b]
XYZXZXXXYXYXXYZXZXXZYXYX-YZYZXYYXXXZYXYXXYZYXYZX YXYZYZZYX
XXZYYXYXYXZXZXYZZXYYXYZZZXZX-YXXXYZXXZXYXXYXXZXX YZYXZYZXX
ZYXZXXXYXYZYZXXXZXXZXYZXZXXX-YXYXXYZYZZYXYYYZXYZ YZXYZYZZXX YZXZXXZYXYXXYX

[c]
XYZXZKXXXYYXYZXYXYZYXYZXYX-YZYZYXYZZYYXYXXZYYYXXY ZZXYXYXZY ZXZYXYXXZXXYZZXXXXYXZXYZX-YYZYYYZXYX

Non Repeat Lettered Plaintext: The lettered plaintext, P1, will be rendered into a non-repeat plaintext, by interjecting the white color, W, in between every occurrence of two letters of the same color next to each other. The result for the above samples will be:

[a] XYZYXYXYZWZYXYZXZYWWYXYXWX-YZWZYXYXWXZYZYWYX

[b]
XYZXZXWXWXYXYXWXYZXZXWXZYXYX-YZYZXYWYXWXWXZYX YXWXYZYXY
ZXYXYZYZWZYXWXWXZYWYXYX-YXZXZXYZWZXYWYXYZWZWZX ZXYW-YXWX
YZXWXZXYXWXYXWXZXWXYZYXZYZX-WXZYXZXWXWXYXYZYZX WXWXZXWX
ZXYZXZXWXWXYXYXWXYZYZWZYXYWY-WYZXYZYZXYZYZWZXW XYZXZXWXZ YXYXWXYX
XYZXZXWXWXYWYXYZXYYZZYXYZXYX-YZYZYXYZWZYWYXYXW WXYZWZXYX-YXZYZXZYXYXWXZXWXY ZWZXWXWXYXZXYZXYW, YZYWYWYZX YX

The Expanded Plaintext: Each of the above samples can be expanded to any size by adding the same letter next to itself as many times as desired. The result will be readily re-compressed into the non-repeat sequence, simply by eliminating all the repetitions.

The Letters-Space: In this implementation, the large variety of spaces will be drastically reduced. The letters space here will be constructed as a "spread sheet"—the space elements will occupy a box in a two dimensional matrix:

X Y Z W X
X Z W W Y
Z X W Y Z is one such example. This two-dimensional array arrangement will also allow for a clear definitions of bridges between the elements. For each element there will be 4 possible bridges:

U—"Up" a bridge pointing to the element above;
D—"Down" a bridge pointing to the element below,
R—"Right" a bridge pointing to the element to the right;
L—"Left" a bridge pointing to the element to the left.

The U,D,R,L will thus be referred to as the direction letters. These letters represent the four bridges assigned to all elements of the space (except those on the envelope which are matched with either three or two bridges only). There are no diagonal bridges—only horizontal and vertical.

The Cayley's Implementation Universal Encryption Space

For a letter space to qualify as a universal encryption space it must comply with the full access rule. The following small letters space does:

X Y Z
X W Z
X Z Z

And hence the above space will be sufficient for encryption of any size message.

And so will:

X X X Y Z Z Z
X W W W W W X
X W X Y Z W X
Z W X W X W X
Y W Z Y X W Y
Y W W W W W Y
Y Y X X Z Z Z

The Raw Cipher: The raw cipher, is constructed by first agreeing on a starting point, and then marking the directional letters from it. Suppose we assign the left top X letter as the starting point. Since we agreed that every message will begin with a space which is expressed as XYZ in the Daniel alphabet, we know that the first letter of the non-repeat plaintext will be X.

Recalling that the raw plaintext 'I Love Lucy' became the non-repeat plaintext:

[a] XYZYXYXYZWZYXYZXZYWYXYXWXYZW-ZYXYXWXZYZYWYX

We can use the above (9 letters space) to create the raw cipher as

DDUURRLLRLRRDLRDLRUULLRRDDLL-RRLRUULDULRLDRLDUURRD LRDLRUULL RLDRLDRRLRUULRLDUL

Production Cipher: The 4-letter raw cipher can be expressed as final product cipher in many ways. One condensed form will be based on mapping the U,D,L,R letters as follows:

'R'—>'00'
'U'—>'01'
'D'—>'10'
'L'—>'11'

And then any string of 8 directional letters will be expressible as a hexadecimal character.

The Decryption Space: To recover the; plaintext, one will use the encryption space for the decryption process. Since the starting element is known (the upper-left element), the encryption space can be used to interpret the raw cipher, after it is being recovered from its production format. At the raw version, the, four direction letters will expose the encryption path, and hence the expanded plaintext, which will be readily compressed into the non-repeat plaintext, and from there back to the raw plaintext.

Map Representation of Cayley's Daniel Implementation

It might be more readable to depict Cayley's Daniel implementation by using the customary 4-color map graphics. A "country" as defined in the Terms and Definitions section will correspond to the customary depiction of a country or a, painted zone in the original representation of the 4-color conjecture. Accordingly the non-repeat plaintext may be viewed as a trip plan for a traveler to walk from country of color X to a country of color Y, then color Z, etc. as the plaintext sequence implies. This country-hopping tour guide, leaves open the exact path to be selected by the traveler. As long as the traveler follows the sequence of the plaintext, the exact path does not matter. In fact there are infinite paths that will comply with the country-sequence. Each such path is a potential ciphertext. When considering the graphic map representation it is obvious that the cipher may be much longer than the plaintext, and that the same plaintext can be mapped into any number of actual paths. It is also clear that decryption of the path is straight forward when the path is overlaid by the map. One could then simply read the sequence of visited maps, and reconstruct the plaintext.

Figure 15A:
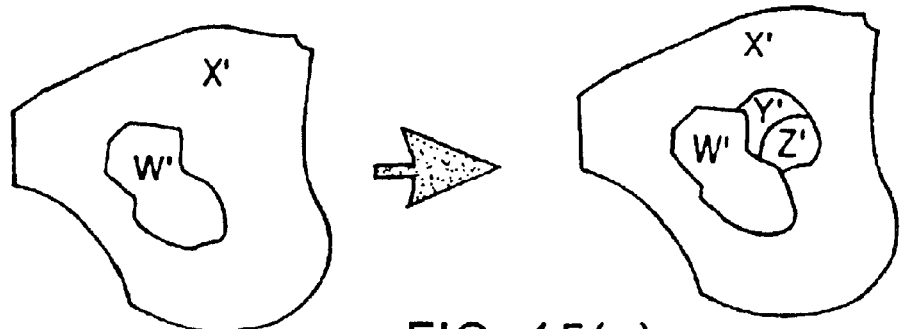
FIG. 15 is an illustration showing how a general four colors map is adjusted to comply with the complete-access condition.
Figure 15B:
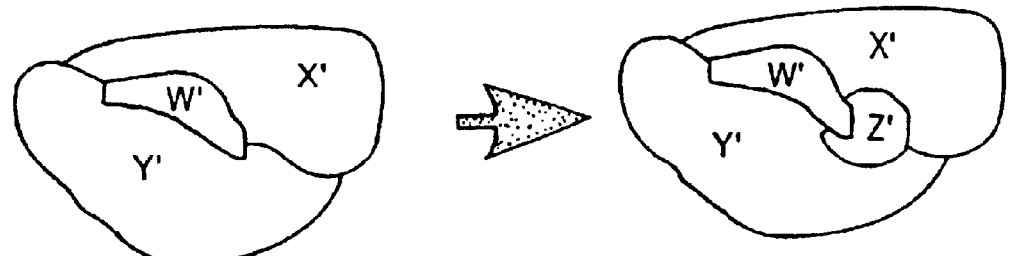
Figure 15C:
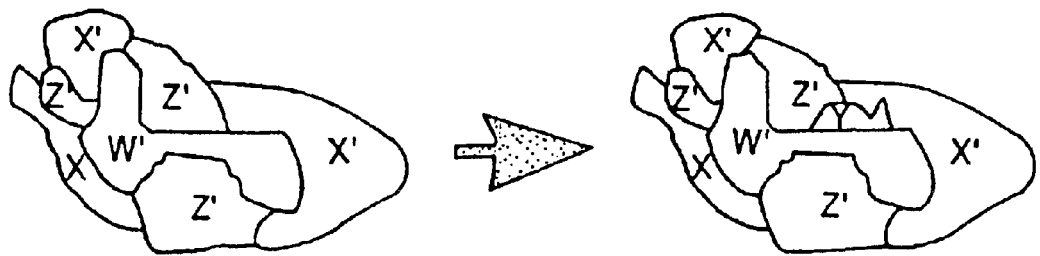
Figure 16:
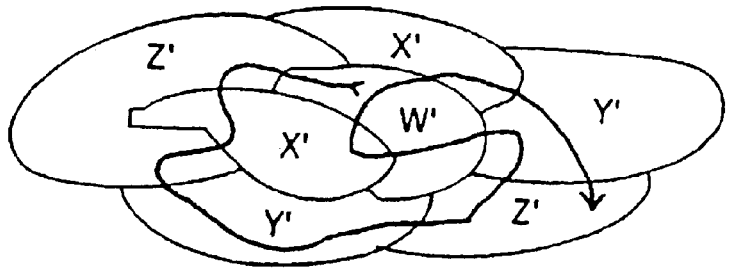
FIG. 16 depicts how a trail (cipher) is marked on the letter space.
Figure 17:
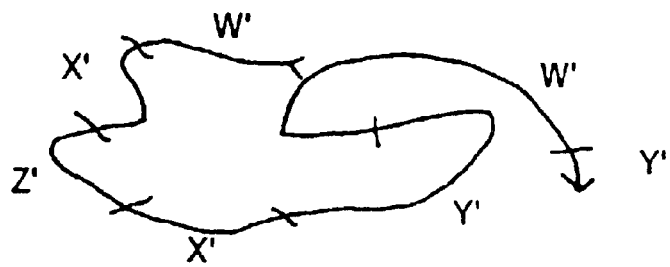
FIG. 17 depicts mapping a sequence of choice on a given cipher.

FIG. 15 depicts how any planar map painted with 4 colors (always sufficient) can be readily rendered to comply with the full access rule:

FIG. 16 offers a graphic representation of Daniel's encryption procedure:

FIG. 17 shows how the cipher which was constructed in FIG.-c2 can be mapped into any sequence (plaintext) of choice.

Figure 18:
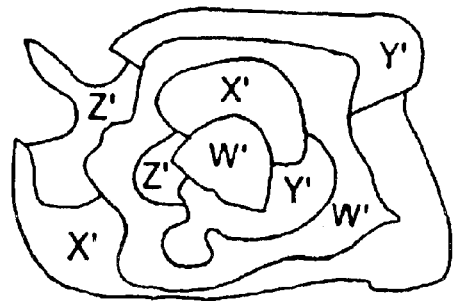
FIG. 18 is an illustration illustrating a ring structured lettered space.

FIG. 18 depicts the basic "ring structured" full-access universal key. A W country is surrounded by a ring-of all other three countries, which in turn are surrounded by a W ring, and again an X-Y-Z ring, for as many layers as desired.

Figure 19A:
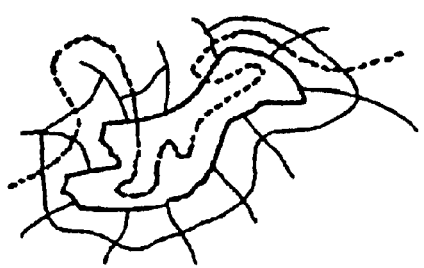
FIGS. 19a and 19b illustrate the concept of nesting.
Figure 19B:
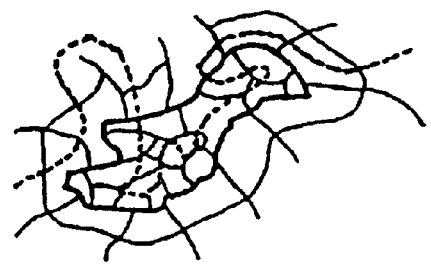

FIG. 19(a) depicts the concept of nesting. In FIG. 19(a) the bold line represents a single country; in map (b) it is seen as an underlying map featuring the deeper-seated message.

The Operational Mathematics of CAYLEY's Implementation

The preparation phase:Since Cayley's implementation uses three colors only (X,Y,Z), excluding the white color, W, it's necessary to develop a conversion table from standard symbols. The above illustration was based on alphabet-only conversion. Since there are 26 letters in the English alphabet, one could use a standard 3-colors conversion as the table above shows. Three colors allow for 33=27 distinct symbols to be mapped. And so the letters and the space symbols were selected.

It would be more convenient to use five-colors, to allow for 35=243 symbols to be mapped, which is roughly commensurate with the extended ASCII table which features 256 slots (many of them empty).

Either way, any plaintext can be readily translated into a corresponding sequence made of the three colors X, Y and Z.

Breaking the repetition is straightforward too. The letter W is interjected between any two letters of the same color. The result is the non repeat plaintext.

The question of how to expand the non-repeat plaintext into the expanded version deserves some attention.

It is important to recall that the sender of the message can choose any expansion to any degree without prior consulting with the intended reader. Whatever the expansion, the intended reader will be able to compress it back to the non-repeat plaintext, and from there to the raw plaintext.

The expansion of the non-repeat plaintext may be viewed as a function of the selected key (the letters space).

The Cayley implementation letter space is a two dimensional array of the four colors; X, Y, Z, and W. The bridges from each element are horizontal and vertical only. The size and configuration may vary considerably, with the only requirement being the full-access property.

There are infinite ways to comply with the full access property. One simple construction procedure will be outlined here:

First establish a single element, say color W. This first element is surrounded by 8 cells in its two dimensional appearance:

```
1 2 3
8 W 4
7 6 5
```

Second, assign the colors X, Y and Z to these 8 cells such that Each of the colors X,Y,Z will be at one of the following spots 2,4,6, or 8. That is to insure that from the center W cell, it would be possible to "walk over" to any of the other three colors. Also make sure that these 8 spots are filled up in such a way that a string of either color (X,Y, or Z), will "see" the other two colors on its opposite end. Like:

| X X X | X X Y | X X X | X Y Z | Y Y X |
| Z W Y | Z W Y | Z W X | Z W X | Y W X |
| Z Y Y | Z Z Z | Y Y X | Z Z Y | Y Z Z |

Next, surround the selected 3×3 square with a ring of white color:

```
W W W W W
W X X X W
W Z W Y W
W Z Y Y W
W W W W W
```

And then repeat the process used for the 8 cells around the first W cell, on the new level with 24 cells, marked as T below:

```
T T T T T T T
T W W W W W T
T W X X X W T
T W Z W Y W T
```

-continued

```
T W Z Y Y W T
T W W W W W T
T T T T T T T
```

One such construction would yield:

```
X X X Y Y Y
Z W W W W W Z
Y W X X X W Z
X W Z W Y W Z
Z W Z Y Y W X
Z W W W W W X
Y Y Y Y X Z Y
```

Which in turn would be surrounded by a W ring:

```
W W W W W W W W W
W X X X Y Y Y Y W
W Z W W W W W Z W
W Y W X X X W Z W
W X W Z W Y W Z W
W Z W Z Y Y W X W
W Z W W W W W X W
W Y Y Y Y X Z Y W
W W W W W W W W W
```

And so on, for as long as desired, introducing as many variations as desired. One can easily ascertain that the thus constructed letters-space (key) is complying with the full access rule.

Given any proper key, (a space complying, with the full access rule) one could devise many possible algorithms to effect the expansion of the non-repeat plaintext. Two are discussed below:

1. The full visibility algorithm
2. The one step visibility algorithm

The full visibility algorithm: Consider the sequence, i,j within the non-repeat plaintext. Since it is non-repeat, it is clear that i≠j.

The hitherto mapping of the non-repeat plaintext on the key created a path which has now reached a cell colored i, and the question is now how to continue that path.

The full visibility algorithm will check the 8 cells surrounding the current i cell. Then check the 16 cells in the next "ring" of cells, and then the 24 cells beyond that, up to any desired depth, including, if necessary the full size of the letters space. When done, it would have the full visibility to chart a path of the form:

iiiiiiiii, . . . i,j and thus achieve the desired expansion. Once so, the "status cell" will become j, and the same procedure will repeat itself towards whatever color is next to that j in the non-repeat plaintext (which may be i, but may not be j).

The one-step visibility algorithm: This algorithm takes the opposite end of the scale, so to speak. It assumes only one step visibility. Thus from the given i cell, the algorithm will check the 4 cells towards which that i cell (the status cell) will have bridges. These are the cells, up, down, right and left with respect to the status cell.

If one of these cells is of color j, the path-charting algorithm (the cipher generating algorithm) will "walk over there". And then that j cell will become the status cell.

If there are more than one j-cells, then the algorithm will either select randomly one of them, or use some preference. Say, up-cells have priority over left-size cells, or such like.

If none of the 4 cells which the i status cell has a bridge, is of color j, then it must be that at least one of them is of color i. This is mandated by the full access property. If only one of those four is of color i, then that one is selected as the next cell. If more than one, than again, a random selection may be chosen, or a preference list may be employed as described above.

However the selection takes place, the new status cell will now be an adjacent cell which is also of color i.

Now the selection process as described above will repeat itself as it happened for the former i-cell. There is one difference though. The already-visited, cell will be marked as such, so that when more than two adjacent cells are of color i, the one that was already visited will have lower priority. This is designed to prevent an endless see-saw where the status cell will switch endlessly between two adjacent cells of the same color.

The above scooting-over process will continue until such i-cell will be reached where there will be an adjacent cell of color j, and the status will step over to that cell. Such eventuality is guaranteed by the full-access attribute.

Once the j-cell was found, the process of finding the next color (not j) will resume as above.

The wandering around the range of i-cells will be recorded as expansion of the non-repeat plaintext.

As indicated above, these are but two of the many possible algorithms that would chart a path on the letters-space to encrypt the non-repeat plaintext.

The resulting path, described as a series of directional symbols: U,D,L,R will then be readily decrypted towards the expanded plaintext, simply by following the marked bridges, and denoting from the letters space (the key), which is the color of each visited cell.

The expanded plaintext will then be recompressed to the no-repeat plaintext, and from there to the raw plaintext.

Hardware Implementation

The Daniel key is defined as a "wired array" which lends itself very well to hardware implementation. We have the proven technology to build large two dimensional arrays of value points. The minimum value per wired point, will have to be 3, as defined above. The Cayley's 4-color theorem, makes the four color very attractive. And since one needs two bits to represent the value three, or the value four, it appears advantageous to select Cayley's 4-colors for a quick hardware implementation. Cayley's implementation can be accomplished through any memory media holding two-dimensional binary digits.

```
1 0 1 0 0 0 1 1 1 0 0
0 1 1 0 1 0 0 0 1 0 1
0 1 0 0 0 1 0 0 1 1 1
0 0 1 1 0 1 1 0 1 0 1
``` where any two horizontally adjacent digits are interpreted as a letter (X,Y,Z,W), and the neighboring 4 double-spots would be interpreted as the bridged-over letters:

```
      1 1 . .
    0 1 0 1 0 0
      . 1 1 . .
```

The middle 01 cell is flanked by 4 neighbors: 00, 11, 11, and 01.

Any non-repeat plaintext will thus be quickly processed to generate the cipher. One apparent use is for quick authentication which may include nesting and compounding as an added value.

Daniel: Operational Procedure

Daniel may be applied in the following situations:
1. personal privacy
2. planned rare or occasional communication.
3. unplanned communications (rare, or occasional)
4. Communication-Activity Group Situation The application of Daniel with respect to each of these situations will be presented below.

In each of these cases, the procedures apply to message security, message authentication and sender authentication.

Personal Privacy Situation

This is the case where a person wishes to reduce his or her thoughts into a written or other form record to fend off the ills of fading memory. For highly sensitive information that person might be hindered by the fear of loss, or forced discovery. As a result many individuals refrain from committing to paper or to any other form of expression their own thoughts and sentiments. This often leads to permanent loss of the historic record. For public figures, such avoidance has public repercussions.

Using Daniel, a person in the above circumstances, will do the following:
1. Select a key (letters-space).
2. Prepare his or her raw plaintext.
3. Process the raw plaintext through Daniel software to produce the production cipher.
4. Prepare a back-up text, (the deniability text) to serve as the deniability basis, if necessary.
5. Use the Daniel software to prepare a key (the denial key) to match the back-up text with the production cipher in (3).
6. Hide the key in (1).
7. Pseudo-hide the key in (5).
8. Safekeep the production cipher in (3).
9. Destroy the plaintext in (2).

At this point the user is "Daniel protected."

The user may, at will, re-produce the raw plaintext following this steps:
10. Process the production-cipher with the Daniel package to reconstruct the raw plaintext.

The production cipher is now protected against cryptanalysis based on the sophistication and complexity of the selected key in (1). It is also protected against a forced exposure. Under pressure the writer will fall back to his or her deniability version, using the following steps:
11. Present the backup plaintext in (4).
12. If challenged, present the corresponding deniability key in (5) and use the Daniel package to prove that the ciphertext and the plaintext do match.

Note: Even if step (6) above will fail, and the true key will be exposed, there is still no way to prove mathematically that it is the right key vis a vis the claimed deniability-key. Mathematically the two keys are equivalent.

Planned, Rare or Occasional Communication

Daniel can be used for the situation where two or more people plan to put in place a private communication system, for rare or occasional needs.

The procedure here will follow the steps outlined in the personal privacy case, with the following change:

The selected key will have to be shared between the two or more communication partners. In the simple case this is the same key that allows both encryption and decryption. Thus each member of the shared key group can at any time send a Daniel encrypted message to any other member of the group, who will then be able to decrypt it.

The face value security of such communication will be hinged on the complexity and choice of the key, and the sender choice of expansion.

The deniability option here can take two modes:
1. individual mode
2. shared mode.

In the individual mode the sender will follow the deniability steps outlined in the personal privacy section, and thus be ready with a back up plaintext and a key to match. This mode offers the sender protection even against the intended reader, should he or she, turn against the sender to implicate him with the sensitive message. The sender will be able to deny that claim, and stick to the deniability (backup) story, asserting that the backup key was the one shared with the receiver. If that aspect is an issue, it would-be best for the sender to send different ciphers for each of the intended receivers of the message. This can be done by employing the choice-expansion step outlined in the core description. The same plaintext can be encrypted to different ciphers for different readers, who would all be able to decrypt the various ciphers to the same original plaintext—even though they all use the same key. The variations in the cipher appearance will make it mathematically impossible to prove that the various ciphertexts do actually all correspond to the same plaintext. Thereby the sender has some defense against the various receivers ganging up on him.

The case of more than two communication partners may also make it advantageous to use the compounding and nesting capability.

One savvy use of nesting is in highly hostile situations where one's messages are very likely to be attacked. The writer might then compose one fake "decoy" message as the first level, and then add the true message as a sub-level below. The idea being that a cryptanalyst might somehow read the first-level message, and consider it as the true message, and thus not even try to further explore that cipher. The writer may also compose the first level message in a way that is likely to stimulate a certain visible action by the other side. When the writer happens to notice that this action is being taken, he or she would treat it as an indication that the decoy message has been "broken."

Unplanned Communication

This case refers to situations where two individuals who did not plan to communicate secretly with each other, do experience this need, and the circumstances are such that they can not set up an ordinary planned communication as defined above.

This case may be divided into two categories:
1. Random need.
2. The "lightning rod" case The first refers to two random individuals who suddenly develop a need for secret communication. One way to handle this is as follows:
1. The sender writes the sensitive message in plaintext P.
2. The sender selected a Daniel key K, and uses it to process P and produce a corresponding cipher C.
3. The sender now writes a second plaintext message P'. P' must have something in its contents, that would indicate to the intended receiver that it is a decoy message, not the true one. (more on that below).
4. The sender uses Daniel to construct a denial key K' to match P' with C.
5. Steps (3) and (4) are repeated with respect to a third message P" and a corresponding key K", and then repeated again, if desired.
6. The sender sends C, K, K', K" to the reader in the open.
7. The intended reader uses:Daniel software to reconstruct P, P' and P" from C,K,K',K".
8. Based on the contents of P,P' and P", the intended reader will know which is the valid message, and which ones are decoy.

Note that this procedure assumed an intruder (an unintended reader) who is privy to all the communication sent by the sender to the intended reader. Consequently, the intruder will also be able to reconstruct P, P' and P". And now it becomes a question of the ingenuity of the sender, whether he or she were able to construct the various messages in a way that the intended reader by their content will know which is the true message, while the intruder will not. The messages may refer to a private matter, or a personal occurrence with respect to the intended reader, which the intruder will not be aware of.

By using Daniel, as opposed to sending the plaintext in the open, the sender still maintains his personal deniability option, as outlined in the personal privacy section. Also, the intended reader will be able to use the true key to send back messages and thereby indicate that he or she got the message right.

The "Lightning Rod" Case

This is a situation where a person is soliciting or expecting information from strangers who wish to conceal their identity and their message. Such are whistle blowers, people who have information about criminal activity, people who leak information to the media etc.

In that case the expecting person may publish the various keys sent to him, or her, adding to their purported legitimacy, and further cementing the confusion of the would be intruders.

Communication-activity Group Situation

This is the case where two or more people wish to conduct private business over open lines of communication. It is an on going activity in which it is desired to manage who knows what when, and who knows nothing, never. The Internet today becomes increasingly reliable and the communication platform of choice. One could use it to manage a project, to run a business, to further a mission, while communicating securely, on the basis of the cryptographic strength of their system.

Deniability here is important, of course. But perhaps more so, is the variable strength feature: The ability to fine tune control the encryption strength, so the more sensitive the information, the better its security. And of similar significance is the ability to use compounding, and more so nesting, as explained below.

In a project situation, it is often desired to have one part of a general message exposed to all parties to the project, and then add some notes, or comments designed only for the managerial level, and perhaps other messages for the executive level, or for the accounting level etc. The nesting option will offer unlimited possibilities in that regard.

The various categories of intended readers will be equipped with a special key to allow them to read from the generally distributed message, the part that is intended solely for them.

Nesting allows for managerial hierarchy where each management level can read the messages nested for themselves and lower managers, but not what is sent for higher ups.

Nesting can be used for the sender to build in comments designed for himself, for purpose of authentication or later reading. The complete message will be sent to all readers, regardless of the level. Unlike compounding, where parts of the messages which are intended for some readers and not others, and those parts are identifiable and can be chopped off, in nesting this can not happen without destroying the basic message too. Which is why nesting is so appropriate for authentication.

The Internet way of handling information is based on tearing apart large documents, and handling the pieces separately, before finally regrouping them to the original whole. This mode stimulated the practice of detailed headers and trailers that travel with each piece, and allow its subsequent identification. This practice is now increasingly used in general project documentation. Daniel's nesting procedures would fit right in.

The applicability of nesting is very significant with respect to military situations, command and control, and other clear hierarchies.

The one complexity that is being added here is with respect to managing the distribution of the various keys.

Daniel Capability Analysis

Key Variability

Keys have been cemented into a singular form: a binary sequence. Preferably as short as security will allow. This idiosyncrasy has survived the most significant novelties in the field: the emergence of DES and its mutations and variants, and the brilliant invention of public-key schemes, as exemplified by RSA.

Daniel breaks away from this key idiosyncracy. If offers a multi-dimensional variability. The one-dimensional binary sequence is replaced with the letters-space which is constructed with great flexibility, akin to a network. The only restriction on the key is the full-access property, and with that property, any key of any dimension, of any size, will be a proper key to be used with the same software. Compare this with the need to install completely new software if the DES key undergoes a change, or an RSA key is beefed up. With Daniel, a two dimensional key, as described in the Cayley's implementation is readily replaceable with a three, four, five, or more dimensional keys, without any significant change in software.

Unlike the one-dimensional case, where any key, regardless of symbols count is reducible to a binary sequence, the multi-dimensional key here has a built-in variability with respect to how many letters (symbols) are used in the letter space. That is because the bridges that are defined in the letters space do connect full symbols to each other—not binary digits.

To select a Daniel key one must decide the size of the Daniel alphabet, the configuration and dimensionality of the letters space, then the actual construction of that space and its size. All that aggregates into the cryptanalytic distance which is presented before the cryptanalyst.

As has been shown, the key may be a space comprised of the number of letters in the Daniel alphabet, or it may be infinite in size. Now the size of the key can grow, as mentioned, without change in software, but also without great change in processing time. This should be compared with the situation in DES and RSA. The latter are blockciphers: each is taking one fixed size block at a time, then figures out a cipher sequence for the block. The blocks are then concatenated. Accordingly, any increase in key size will mean more computing effort per each and every block. The stream-cipher mode in Daniel renders the processing time, almost independent of the key size. The larger the key, the more options there are to construct a proper cipher, but the effort to do so in determined by the size of the plaintext, not the size of the key. The cryptanalytic implication here is that one could not assume a limited key size, owing to the prohibitive encryption effort. All sizes, let alone compositions, should be a possibility as far as the cryptanalyst is concerned.

The Cayley implementation-presented here is of special significance. It conceives of a two-dimensional four color picture as the key. The essence of Cayley's 4-color conjecture (now theorem), is that any map, however convoluted can be painted with only four colors. This theorem, in turn, claims that given a 4-color 2-dimensional key, the cryptanalyst can assume virtually nothing about the contents of the key. In other words: the fact that a map is painted with only 4-colors betrays no further information about the map itself.

Since the key can be constructed to become larger than the message, it thus loses its attraction to the cryptanalyst, who would rather attempt to find the plain message directly, as it offers fewer hurdles. The message is subject to human language characteristics, while the key is open for randomization at will.

Historically keys were small because they often had to be committed to memory, or physically hidden. Also the pre-computer means to computing limited the key shape and size. But today the bottle neck is elsewhere. There are no practical limitations to carry around and compute with very large keys. The Cayley's implementation, as shown, can use as a key any two-dimensional binary memory media, where the memory is fully accessible and extraordinarily fast.

The Key as a Recovery Tool

A long term stable design of a secure communication must take into account the possibility of compromise. Somehow the secrets are secrets no more. In that event it is necessary to recover fast and re-establish secure communication. One way to do it, is of course, to install a new encryption paradigm, new algorithms, new methods, new code books etc. While attractive, this massive overhaul is extremely impractical for a large dispersed network of secret communicators. And in that respect the key can be looked upon as a fast recovery tool. If the security of the system is based solely on the contents of the key, while all else is in the open, then once security is breached, the key is the only part that needs to be replaced to reestablish the desired security. Accordingly the key can be defined as the component of the cryptographic system which must be replaced to recover from a total collapse of security. That was one reason why keys were preferably small. However, the larger the key and the more its variability, then also the more the recovery distance from a breach of security. If more changed from the breached system, there is more work to breach the new one. Since Daniel key is extremely variable, it also provides profound security capability on recovery.

In other words unlike DES and RSA and their like, the Daniel processing algorithm is extremely simple. It is the key that holds the security promise.

This patent application describes the Daniel invention and contains the mathematical description of the invention, its respective process design and one limited application format (Cayley's 4-color map). The description herein should enable anyone with nominal background in cryptography and nominal computer skills, to put together a Daniel implementation and perform the Daniel encryption, decryption and deniability processes.

A Set Theoretical Representation of the Invention

Consider two sets $X=\{x\}_n$, $Y=\{y\}_m$, denoted as type X and type Y. Construct an ordered list (sequence) such that k elements of X will precede l elements of Y:

$$Xi, Xj, \ldots xr, yp, yq, \ldots yt$$

$$\longleftarrow k \longrightarrow \longleftarrow l \longrightarrow$$

The (k+l) long sequence can be reduced according to the following rule: all adjacent elements of x are marked by the set symbol X, and correspondingly for Y. This rule will reduce the above sequence into: XY which will be denoted as the 'guide'.

Note that regardless of the values of k,n, l and m (all =>1), and irrespective of the identity of the elements in the x- and y- sequences, the guide will always look the same; Conversely, the guide: XY can be expanded to infinite sequences ($n^k m^l$)—all of which will collapse back into this guide.

The basic guide-sequence (gs) expansion-reduction procedure can easily be expanded to longer guides of two sets:

XYXYXY . . .

and to guides based on any number of sets $\{x\}_{nx}$, $\{y\}_{yn}$, $\{z\}_{zn}$, $\{y\}_{wn}$:

XYWZYWXYWZXYX . . .

In all such cases the guide may expand to many sequences, all of which collapse back into the same guide.

This asymmetric gs procedure may offer cryptographic possibilities, and this prospect is the subject of this paper.

Suppose that a given sequence S is written such that the set-identity of its s elements is not readily readable.

Consider the case of only two sets, X, Y. The sequence S may then collapse to:

X

XY

XYX

XYXY

...

XYXYX...

$\longleftarrow s \longrightarrow$

And to the symmetric lists (where X and Y exchange places). This computes to $O(s^2)$ options. For the case of p sets, the number of possible guides computes to $O(s^p)$ possibilities. Say then that one could hide the identity of a guide by increasing the size of the sequence s to any desired value.

A reader who can identify the set-identity of the elements of s, will readily collapse s to the proper guide, regardless of the size of S.

To complete a cryptographic picture one must address the question of how to hide the set identity of the elements of s.

Graph as a Hiding Device

Any ordered pair of set elements may be regarded as an arc, or edge. Accordingly one could express any sequence: S, by identifying a starting element $s_0$, followed: by a sequence of corresponding arcs. Considering the combined set of the respective type sets (X+Y in the two types case), arcs may be written in a format that does not disclose the type identity.

Pixel Plots

Figure 20:
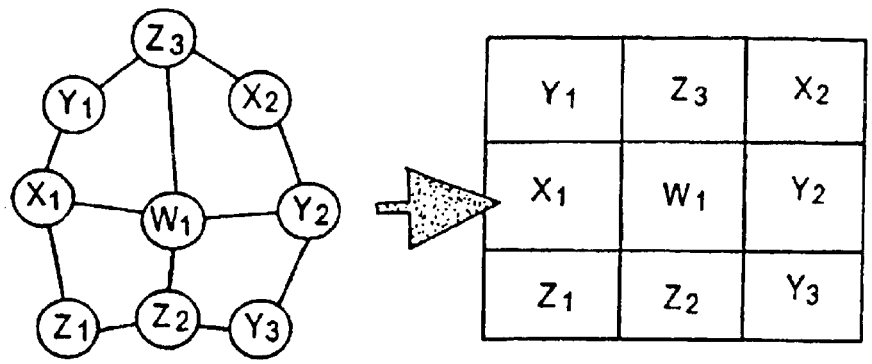
FIG. 20 depicts the equivalence between an arc represented graph and adjacency representation.

One way to accomplishers objective is to map all the elements of the various types into a two-dimensional "pixel plot" as depicted in FIG. 20. Pixels are packed (adjacent) rectangles. Arcs can be represented by adjacency. One pixel will contain one element Each 'middle' pixel (element) will have a common border (adjacency) with two horizontal neighbors, and two vertical neighbors. Thus we consider four arcs marked as up, down, right, left or: U,D,R,L respectively as depicted in FIG. 20.

This pixel plot configuration severely restricts the expressed arcs (at most four arcs are allowed from each element). This restriction will limit the number of s sequences that can be expressed through this pixel plot, but for those limited sequences a full expression is possible by identifying a starting pixel (element), and a sequence of U,D,R,L, like:

UDDDRLUDLLLR . . .

Anyone in possession of the arc sequence, but denied the possession of the pixel plots, will not be in a position to reconstruct the element sequence s. Furthermore: given an arc sequence (a path) one could map the various elements in the pixel plots so as to create a correspondence between this path, and any desired (small enough) guide.

The latter implies that the traditional cryptographic notion, of "breaking the code" or more formally: cryptanalyzing the cipher, is potentially undone. The cipher (the path, the arc sequence), can not be "broken" in the traditional sense since the ciphertext does not contain sufficient information to select a single plaintext (guide). In other words: equivocation defeats cryptanalysis. The attribute itself is known as deniability.

An Entropy Point of View

Figure 21:
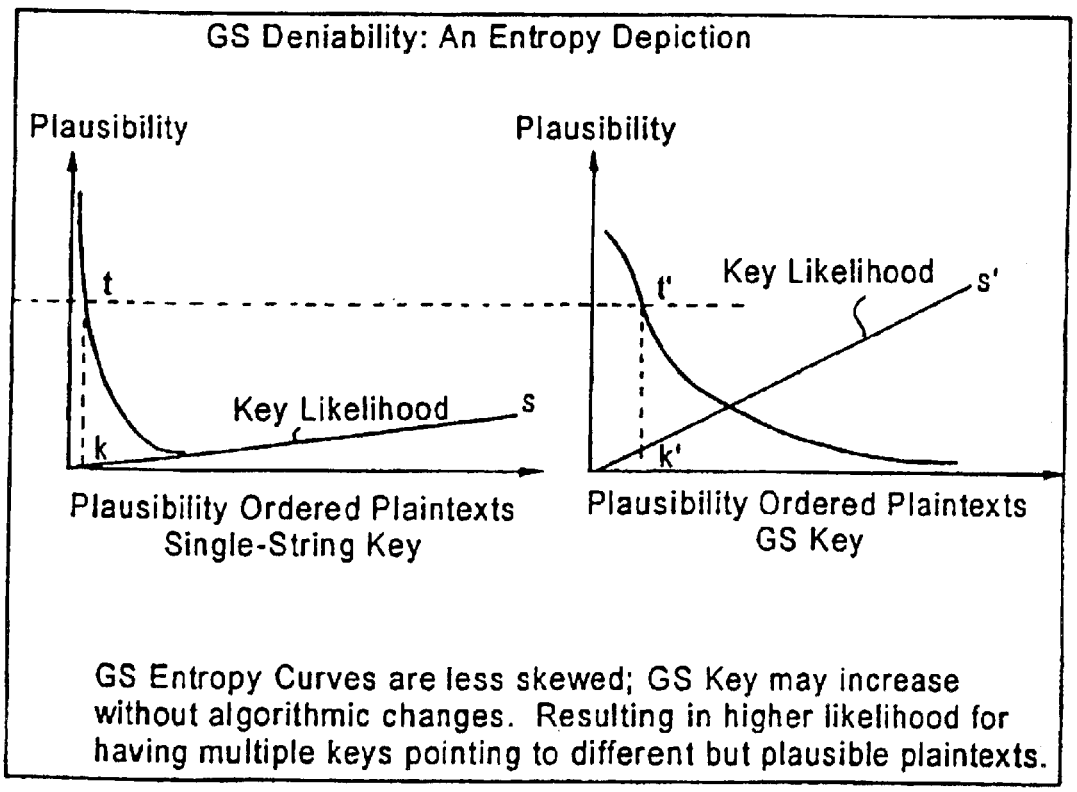
FIG. 21 are two graphs showing GS denability.

Given a ciphertext C, and a known encryption system, E, and also a known key space, S, one would be able, in theory, to list all possible plaintexts which correspond to C. This list can be ordered according to plausibility measures: from the most plausible plaintext (on the left) to the least plausible plaintext (on, the right) as illustrated in FIG. 21. Cryptanalysis is based on the entropy curve that depicts, for a given ciphertext the proportion of possible plaintexts which are also plausible, given the redundancy in the language and any other circumstantial factors. For a given plausibility threshold, (see points t, and t'), one could ask what is the likelihood that the key space would include a key that points to any of the plaintexts left of t. (or t'). Since the encryption algorithms operate without regard to plausibility, the answer to the latter question is that such likelihood is proportional to the number of plausible messages (left of point t, t'), and proportional to the key size, (s, s'). For the prevailing encryption systems, with a single string key the entropy curves are very skewed (especially for large ciphertexts), and thus there is a very small likelihood that two keys within the given key space would point to two different plaintexts in the high-plausibility range (left of t). Even if there are such two keys, it is very difficult to find them. This property gives the cryptanalyst a unique target to chase. In other words, the ciphertext points unmistakably to the single plaintext that generated it.

Using gs algorithms, the entropy curves are much less skewed because the plaintext could be of any size smaller than the ciphertext. Hence there are many more possible plaintexts for a given ciphertext, and moreover, the smaller size plaintexts have a higher ratio of plausible cases. In addition, gs key size, even if it is fixed, and even if it is known, is generally much larger than the typical single-string key. This is depicted through a steeper "key likelihood" line (compare s, and s'). The result is that for the same plausibility threshold, gs point t', includes many more plausible plaintexts (marked as a larger section left of t'). And then combined with the steeper key-likelihood line, there is a much higher likelihood to finding many key options (within the key space) that would each point to a different but plausible plaintext. Hence: Deniability.

Literary Reference

Cryptographic equivocation, or say, deniability, has been referenced and discussed in Bruce Schneier, "Applied Cryptography", $2^{nd}$ Edition, John Wiley, 1996, pp. 227–228. This source provides a good formal definition, and a good source to a range of applications. It also offers analysis of public-key and shared key cryptographic schemes, in each of which the line of thought is based on assessing the opponent ability to refute deniability on basis of the non-randomness of the deniability key. In other words: since it is expected from a cryptographer to select a random key, should she point to a non-random decoy-key (deniability key), she would be rebuffed. One could approach that apparent weakness with an opposing logic. A cryptographic scheme which lends itself to easy deniability does not have to rely on random selection of keys. Say then, if the true key does not meet certain randomness tests, neither should the decoy key. "Applied Cryptography", $2^{nd}$ Edition, John Wiley, 1996, pp. 227–228, also makes an important distinction between sender-deniability, receiver-deniability, sender-receiver deniability, and also between plan-ahead-deniability, and at-time-of-coercion deniability. The-scheme here, (gs), should also be protocol-analyzed for these various categories, and such analysis is being prepared for the sequel.

Expansion-Reduction Algorithms: the gs Case

Definitions:

Let E be an operator that expands a list of ordered set names such that each set name is replaced with an ordered list of elements of the respective set.

$$s=E(g)$$

where g, known as "guide" is the ordered list of sets, and s, is the ordered list of respective set elements, known as "sequence". The inverse operator, $D=E^{-1}$, is defined through:

$$g=D(s)$$

D operates by replacing any contiguous list of elements of each given set by the set name. For non-empty sets in g, there are infinite possible sequences, s, each produced by a respective E. Yet, all those s quivocally collapse into the same g.

Procedures and algorithms so constructed will be denoted as gs expansion-reduction algorithms.

gs-expansion Cryptography

For this introductory presentation we choose a restricted cryptographic scheme. Let P be a binary plaintext, and m' its tertiary transformation: m'=XYYZXXY. Where X,Y, Z are the three tertiary symbols. Let m be, the result of operating on m' in the following way: between any two identical: adjacent symbols, a fourth symbol, W will be injected. (m=XYWYZXWXY). m will then be an ordered list made up of four distinct symbols, free of any repetition (no two adjacent identical symbols).

Let us construct a cryptographic key, K as rectangular grid (pixel, plots), such that each pixel is marked by one of the four symbols, X,Y,Z,W, which will also be referred to as "colors". E.g:

X X Y X Z W
Y X Z Z Z X
Z Y W W W Z

Let's refer to this rectangular as "the gs-map", or simply "map". At any given moment one and only one pixel plot on the map will be regarded as the "state plot" or "state pixel". We now define the concept of "step". A step is a change of the state pixel from one to another adjacent to it. Adjacency requires a common line border. A middle pixel will be associated with four steps: up, down, right, left, or say:

U,D,R,L. A pixel on the edge of the map will be associated with only three steps, and a corner pixel will be associated with two steps.

Zones: The map defines contiguous zones. A zone will be a set of same color pixel plots such that from any pixel of the set one could move to any other pixel of the set by a series of steps all of which define state plots of the same color. A zone may be comprised of a single pixel, or spread over the entire map (if it is all colored with the same color).

The full-access condition, property: A gs map in which every zone has at least one pixel such that a single step would change the state to any other color of choice (three choices), is defined as a full-access map, or a map with the property of full-access.

Any full-access map would qualify as gs-key. That is because this property assures that from every given zone, one could move towards another zone in accordance with the dictates of the guide, g. In other words, a full-access map will insure that any guide, of whatever size and composition will be uniquely expressed through.,a sequence on the full-access map (regardless of its size).

The gs encryption algorithm, Egs: Egs, or simply, E, will operate on m, a four-symbol non-repeat expression of the plaintext. (That is a list in which a symbol is never followed by the same symbol). To execute the operation, E will require additional input: (1) a gs key, (map), and (2), an initial pixel-state on it. That initial state will have to be of the color of the first symbol in m.

E will define steps on the gs-map such that each symbol on the m list will be replaced with a sequence of pixels of the same color. The selected symbols will all be defined in relation to the starting state, namely as a sequence of U,D,R,L. The resulting 4-symbols (U,R,D,L) ordered list will constitute the ciphertext C.

$$C = E_{gs}(m, K, I)$$

where K is the gs-map, and I is the initial state.
Note: The U-R-D-L format of the cipher will, per convenience, be converted to a binary list:(U='00', D='01', R='10', L='11'), or any respective representation.

Obviously, the intended reader of c, in possession of K, and I, will readily retrace the U-R-D-L sequence, and identify the pixel color identity. This identification will lead to a color sequence of the same length, and one which is readily collapsible into the generating m plaintext.

$$m = D_{gs}(c, K, I)$$

An eavesdropper in possession of c alone will face the following difficulty:

If the ciphertext is constructed such that no pixel is revisited, it is very easy to construct a map K' and specify I, such that a different plaintext, m' # m will satisfy:

$$c = E_{gs}(m', K', I')$$

One is left to deal with the question of probability. Is m more probable than m'?

The former question is to be asked with reference to the knowledge of the ciphertext, c. Specifically: is the knowledge of c contributing towards identifying m as the true message, as opposed to m'. (On their own m, and m' may be ranked according to circumstantial plausibility, which is not our concern here). The sender could have chosen m' as his true message, and then selecting K' to produce and communicate the same ciphertext, c. This fact implies that any observable pattern distinction between K and K' would not be effective. In general, as it was mentioned and analyzed before, given a ciphertext, c, and a plaintext, m, there are infinite possible keys that would map the one to the other:

$$(c, m) \rightarrow \{K\}$$

which implies that there is plenty, of room for choosing a gs-map K so as to wipe out any potential pattern distinction between the true map and the deniability map. In conclusion, the knowledge of c, does not increase, nor decrease the relative probabilities of m and m'.

The cryptographic sufficiency of the equal probability property: Arguably, the customary analysis of cryptanalytic difficulty is not very important here. However easy it might be to flush out m, it is as easy (or as difficult) as flushing out m'. Say then that all the possible m' are of equal likelihood—which is the case before a cryptanalyst who only knows the size of c, not its contents. (akin to semantic security). Or else say: to increase security, increase the expansion—create a ciphertext of larger size.

Figure 23:
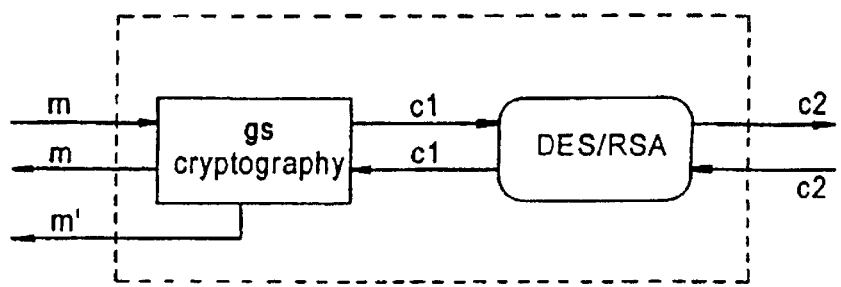
FIG. 23 illustrates the use of Daniel in combination with DES, RSA or any other cryptographic system (to gain the combined benefit)
Figure 24:
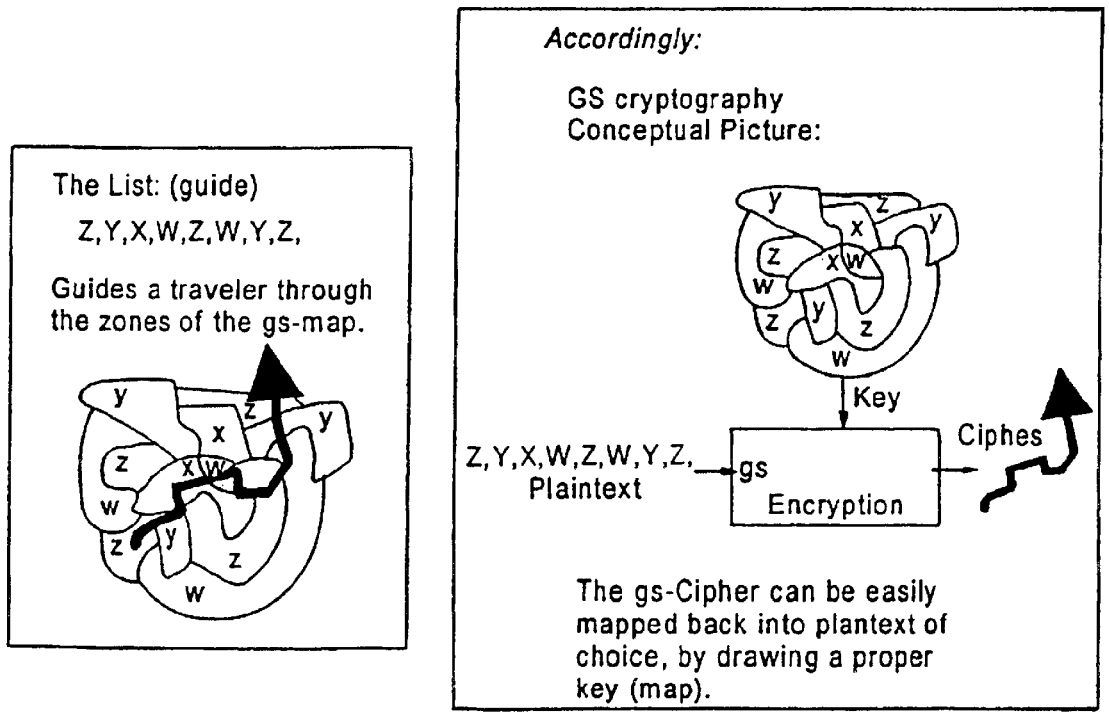
FIG. 24 is a cnceptual depiction of the invented cryptography.

For a given ciphertext, c, of size. (length), l, the corresponding plaintext space M will consist of messages of length l (for the case that each step crosses a zone), messages of length (l-1), (l-2), . . . 3,2,1; summed up to:

$$4(4^{(l+1)}-1)/(4-1) = 4^l + 4^{(l-1)} + \ldots + 4$$

possible messages each of which is of the same probability as seen by a cryptanalyst in possession of the ciphertext, and one without such possession, but with knowledge of its length. Furthermore, one could install the gs, algorithm as a prologue to any cryptographic system of choice (shared key or public key variety), and feed the choice (tested, and trusted) system with the output of the gs system. This would create an overall cryptographic performance which is at least as strong as the choice cryptography to which the gs was added as a prologue, while at the same time offer the user the gs deniability attribute. (see FIG. 23).

Dynamic I: While the initial state, I, may be fixed, and each additional message using the same key could restart from the same spot, it is also possible to render the end of a given sequence (message cipher) as the new I. This would allow one to refer to all the messages sent through the same key as one long stream cipher message, which is then easier to match with deniability messages. Note that if I is fixed it is necessary to insure that every plaintext m, will start with the same color (or a comparable procedure).

Such path was emphasized above as crucial for the purpose of insuring easy construction of deniability or, say, equivocation messages. This requirement might lead one to create a very big key—to the point of impracticality. An easy solution presents itself via the adjoining property of gs keys: Any two keys can be put adjacent to each other so as to create one larger key( concatenation). If two original keys satisfied the full-access condition, so will the combined key. That means that even a small finite key, say:

| |
|---|
| XXY |
| XWY |
| ZZZ | can be easily concatenated with itself to form any large as desired key, without actually requiring the pixel by pixel storage of information.

Applying Deniability: Mainly, the attribute of deniability is a discouraging factor for a would be cryptanalyst who must wonder what good is it to crack a cipher, if it cracks into many equal likelihood plaintext options. Yet, in real cases, those plaintext options may be otherwise ranked according to plausibility, and in that case the cryptanalysis makes sense. However, for purposes of proving the use of a certain plaintext, a robust deniability attribute is a formidable obstacle. Finally deniability is an anti coercion measure. (See detailed analysis "Applied Cryptography", $2^{nd}$ Edition, John Wiley, 1996, pp. 227–228). The sender, or the receiver can unilaterally use it, or they can use it by agreement, which may be more .convincing. The unilateral use, has one interesting application. Suppose Alice and Bob are known rivals and opponents who claim publicly that they don't consider a negotiated solution to their rift. Alice may wish to explore a settlement nonetheless. Yet, if she approaches Bob with that proposition, Bob may publicize this fact and use her approach against her. By using deniability encryption for her message, Alice can safely approach Bob with her conciliatory proposal, and deny and back off from it, once Bob abuses his discretion.

Security without deniability: Applying the gs expansion scheme over a relatively small finite key may lead to increasing number of intersections, as the message volume increases. As these intersections increase, and more and more pixels are being visited more and more often, it becomes increasingly difficult to create a deniability escape, and in that case one would have to analyze the bare cryptographic strength of the gs algorithm.

That strength, at its face value, will have to be based on the brute force effort to unearth the key. Without imposing the full access condition a gs-key constituting of n times n pixels, will register a key space of size:

$$4^{n^2}$$

We compute now the reduction in this number owing to the full-access condition: Consider an n×n gs-map. The $n^2$ pixels may be randomly assigned one of the four colors, X,Y,Z,W. Now substitute each pixel with a 3×3 array of pixels, thereby creating a $(3n)^n$ array of new pixels. The 1-to-9 split will, in general preserve the original color. That is, if the original pixel, before the split was colored X, the new 9 pixels will be all colored X. One could now examine each and every zone on the new map, and find, perhaps, one or more zones which are non compliant with the full-access condition. In that case it is possible to select any pixel of such a zone and instead of the uniform same-color (1-to-9) mapping, to effect a mapping as follows: If the original pixel color is, X, then the 3×3 pixel array that replaces it will become:

| | | |
|---|---|---|
| Y | Y | X |
| Z | W | X |
| X | X | X |

This configuration is a stand alone key map (it complies with the full access condition), and at the same time it imposes no change on its external pixels. Since there is an X color pixel at each of its four sides. By so doing wherever necessary, (per zones that don't comply with the full access condition), one will insure that the full (3n)×(3n) map is compliant with the full access condition. This, in turn, defines a lower limit on the number of full-access compliant maps:

$$4^t$$

where $t=(n/3)^2$
And similarly for a non square map of n×m pixels:

$$4^t$$

where $t=(nm)/9$

This number increases very quickly with the dimensions of the gs-map. And hence a non-deniability security is a serious prospect.

Cryptanalysis: Eli Biham, commenting on the gs algorithm, has made the ready observation that the scheme is woefully sensitive to chosen ciphertext attack. By choosing a single direction ciphertext progressively, say: (1) L, (2) LL, (3) LLL, . . . one will be able to flush out the map methodically. Unlike the encryption process in which the expansion algorithm may be non deterministic (given the many expansion options), the reverse is locking the ciphertext to a given plaintext for a fixed map. A careful implementor will be able to compensate for this sensitivity by inserting warning flags into the internal logic—refusing to decrypt certain patterns of ciphertexts. In the general case where the map is not limited to a two dimensional pixel array, this weakness vanishes.

A cryptanalyst in possession of a large collection of plaintext-ciphertext pairs will face unusual difficulty owing to the fact that any such pair may be matched with infinite number of keys:

$$(c,m) \rightarrow \{K\}$$

The infinity claim hinges on the fact that however many plaintexts that may have been encrypted through a given key, it still may contain unused parts of any size. But even the part of the key through which the ciphertext does traverse is subject to large equivocation.

Consider a known ciphertext-plaintext pair (c,m). Let m be expressed as a guide g of length $\gamma$ (letters, colors), and let c be expressed as a sequence s, comprised of $\sigma$ steps. Since $\sigma \geq \gamma$ there are many options for the guide g to be mapped into the sequence s. We compute here a lower limit to this number to show how difficult it would it be for a cryptanalyst to pin point the exact mapping.

Let $\Psi_\gamma^\sigma$ be the number of possible mapping of g (of size $\gamma$) into s, (of size $\sigma$). Should s be increased by one step, then this step would assume the last color in g, and thus the remaining $\gamma-1$ colors will have the extra options to be mapped into the remaining car steps. Hence:

$$\Psi_\gamma^{\sigma+1} = \Psi_\gamma^\sigma + \Psi_{\gamma-1}^\sigma$$

And since for $\sigma \gg \gamma$ it holds that: $\Psi_\gamma^\sigma > \Psi_{\gamma-1}^\sigma$, we can write:

$$\Psi_\gamma^{\sigma+1} > 2\Psi_\gamma^\sigma - 1\Psi$$

Recurrence leads to:

$$\Psi_\gamma^{\sigma+1} > 2^2\Psi_{\gamma-2}^{\sigma-1} > 2^3\Psi_{\gamma-3}^{\sigma-2} > \ldots > 2^{\gamma-2}\Psi_2^{\sigma-\gamma+3}$$

Or:

$$\Psi_\gamma^\sigma \gg 2^{\gamma-2}$$

Accordingly a 1000 words message, written, say, in 5000 characters, where each character is represented by 5 string long tertiary alphabet (X,Y,Z), plus W intedected to kill repetition, will lead to m=g of length $$\gamma = \frac{4}{3} 25{,}000 = 33{,}333,$$

and will be mapped in many more than $2^{33331}$ options (for s not too close to g in size). This exercise highlights the enormous variety or equivocation facing a cryptanalyst even if she is in possession of many (c,m) pairs.

For a small enough key, it would be possible to collect enough plaintext-ciphertext pairs to accelerate the brute force approach. A more detailed per-se cryptanalysis is prepared for the sequel. For the overall cryptanalytic view it is important to restate the deniability property which may render the traditional cryptanalysis less relevant than normally. Noting: equivocation defeats cryptanalysis. And in addition, it is always possible to create a product cipher with the gs algorithm up-front, and its input fed into any cryptographic scheme of choice—as discussed above. This combination will lend the strength of the selected tested-and-trusted cryptography to the overall encryption, and all the while offer the deniability of equivocation advantage offered by the gs variety.

Nesting: A set $X=\{x\}n$, may be sub-classified into mutually exclusive non-empty subsets: $X_1, X_2 X_3, \ldots$, with respect to which the gs-algorithm can be applied. This subdivision may be made visible to one reader, and invisible to another. In the pixel-plot language, a given zone may be looked upon as a sub-map to the eyes of one reader, and a solid single-color zone to another. Hence the same ciphertext will be read at a sub-level by one reader, and not by another. This lends itself to authentication, digital signatures, and various management objectives.

The Expansion Operator: expanding the guide to one of its many corresponding sequences may be handled in ways which benefit a particular situation. One could make a random sequence selection so as to prevent a cryptanalyst from deducing that the same message was sent twice or more. For other cases it may be advantageous to use a complicated, long sequence for a portion of the plaintext string which is in need of more security, and then shift to less complicated, shorter winding for portions that are less sensitive. The cryptanalyst will not have ready tools to distinguish between the two.

Illustration: Consider the following plaintext:

I LOVE LUCY

Using a mapping table like:
   Matching English Letters to 3-symbol strings

| A - YZY | J - YYY | S - ZXY |
| B - YZZ | K - ZZX | T - XZX |
| C - ZYZ | L - ZYX | U - YXX |
| D - ZXZ | M - ZXX | V - ZYY |
| E - XYX | N - YXZ | W - XZZ |
| F - XXZ | O - XYZ | X - ZZZ |
| G - YYZ | P - XYY | Y - YYX |
| H - XXY | Q - ZZY | Z - XXX |
| I - YXY | R - XZY | space - XYZ |

The above plaintext messages become:

X Y Z T X Y X Y Z Z Y X Y Z X Z Y Y X Y X X Y Z Z Y X- YXXZYZYYX

By convention each message will start with a space (XYZ). Next: The letter 'W' is interjected between any two repeating letters; yielding, the guide, g:

g=XYZYXYXYZWZYXYZXZYWYXYXWXYZW ZYXYXWXZYZYWYX

Let's now pick a very small key, (k) (gs-map), and designate the top-left pixel as the starting state:

| X Y Z |
| X W Z |
| X Z Z |

When we now use the 'guide' above to traverse this key, we create the ciphertext, c:

c=RRLLRLRRDLRDLRUULLRRDDLLRRLRUU LDULRLDRLDUURRDLRDLRUULL- RLDRLDRRL RUULRLDUL (One option out of many).

Where U,D,R,L stand for the directions of travel: Up, Down, Right, Left respectively. The general idea is that the possession of c, does not commit to g, assuming absence of k gs-Reduction Cryptography Consider plaintext, m, in its binary representation. Rewrite m as a 4-symbol sequence, U,R,D,L according to: U='00', R='01', D='11', L='10' (padding with a last zero an odd length m). Now consider a gs-map, K, and an initial state therein, I. With reference to the latter, do interpret in as step sequence (m=s) K (assuming K was picked big enough to allow the full m sequence to be interpreted on it). As this action is completed, that sequence, (s=m) may be reduced to its corresponding guide, g.

$$g=E_{sg}(s,K,I)$$

The premise of the proposed gs-reduction cryptography is that g may qualify as a ciphertext under certain circumstances. ((c=g):

$$c=E_{sg}(m,K,I)$$

As this construction was introduced before, it is clear that c<m in size. Hence: reduction.

To qualify as a bona fide cryptography it must be shown that the intended reader of c who is in possession of K and I, will be able to reconstruct m.

At first sight this is a problem. The expansion of the guide, g=c, to a corresponding, sequence, m=s, is mired with equivocation. It is necessary therefore to agree on an expansion operator that will narrow the infinity of selections into a single sequence. Such an operator will have to be part of the decryption algorithm, Dgs:

$$s=D_{gs}(g, K, I)$$

While it is theoretically impossible to encrypt a random binary message with a smaller size binary string, it is quite feasible to create meta-reduction by exploiting order of sent messages, and, by using para-messages (which contain information about how to interpret the next message).

In this case the initial state I could be regarded as a variable to be communicated along with the guide g=c. By allowing a different I for each message (e.g.: the end point of a given sequence is the starting point of the next sequence), one may achieve meta-reduced encryption. The shortest guide possible is a two-symbol case; XY. One could build a gs-map, K, and select an initial state I such that reconstructing s from g would entail a long winding trip, within the X region so that the original sequence s=m, would be recovered. The Y symbol will then serve as a "stop" sign for the reconstruction process. In all this one might take the view that encryption is a process in which one often trades secret in a safe environment, in order to be able to communicate in privacy within a hostile environment. In certain cases it might be worth it to invest in designing an elaborate gs-map, and a proper I, to achieve a very brief actual message under hostile circumstances. (Much as the burden of code book is so often worth while).

Expansion Operators

There is much room for creativity in constructing expansion operators, which are so crucial in the gs-reduction encryption, and sometimes equally crucial for the gs-expansion cryptography. In general one might classify guide-to-sequence expansion algorithms according to the algorithm visibility with respect to the gs-map. The general procedure may be written as:

$$a=a(p,t,v)$$

Where a ("arc") is the choice of arc from the current pixel state, (p), to an adjacent pixel. (a=U,R,D,L). t is the target color, or the next color on the guide, and v represents a general parameter of visibility. Visibility may extend to the full size of the gs-map, and even to the full length of the guide, or it may be restricted to the identity of the 4 adjacent pixels (among which to choose).

Illustration

The following is an example of minimum visibility expansion algorithm. Based on the current state (pixel address), and its color, and with a target color identified, determine which of the four possible steps (U,R,D,L) to select. The minimum visibility restricts the algorithm to finding the color of the four adjacent pixels. If only one of them is of the target color—go there. If two or more are of the target color, then use a preset preference function among the U,R,D,L choices to select the next state. If no neighbor is of the target color, then according to the full-access property, there must be at least one neighbor (up, down, right or left) which is of the same color. Move there, if there is only one, or make a choice among the two or more options, if any, according to a preset preference function. That function might include a counter of how many times each pixel was visited before, and then prefer the one with the lowest count, because this would help prevent getting "stuck" on a back-and-forth sequence.

Cryptanalysis of gs-reduction cryptography: It would appear that a cryptanalyst here would face a conceptually new obstacle. One which is not present in the prevailing cryptographies, and also absent in the gs-expansion case. This is the task to identify the expansion algorithm. Unlike a finite size string, which can be estimated for its brute force attack effort, an algorithm of expansion can be as creative as the mind that put it together. It is like envisioning a cryptographic scheme from scratch. There is no apparent limit to the complexity, of the expansion algorithm, and thus by just changing it one could control the expected cryptanalytic difficulty.

Hashing: gs-reduction algorithms can readily be applied to the variety of hashing applications. The guide g is hashed output of the sequence s, as dictated by the gs-map, K, and the initial state I. By contrast with the common hashing algorithms, in this case the size of the hashed string may vary, and is in general not necessarily in proportion to the size of the pre-hashed string. In certain situations this may add to the robustness of a digital signature.

gs-Expansion-Reduction Cryptography

Figure 22:
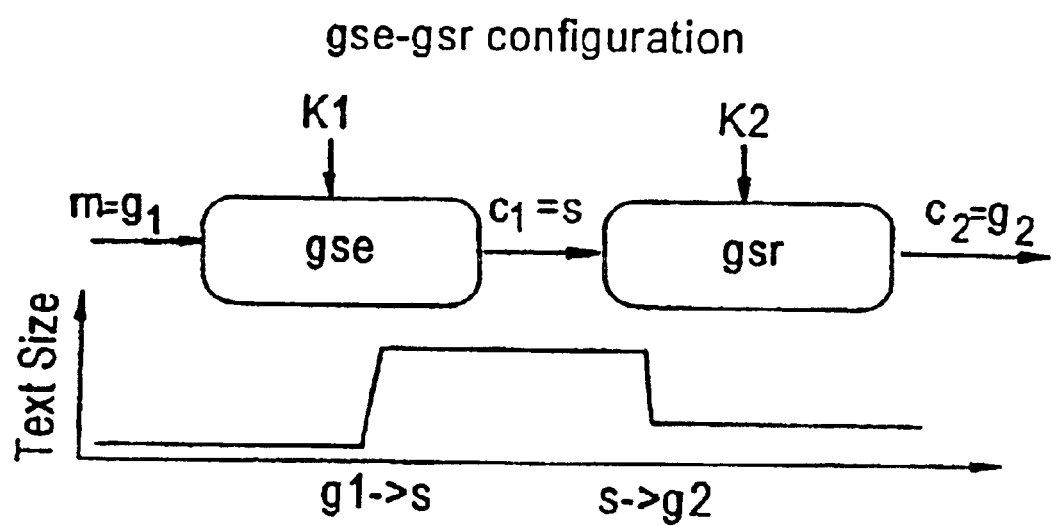
FIG. 22 is an illustration of gse-gsr configuration.

Any two cryptographic operators can be serially connected to yield a product-cipher as depicted in FIG. 22. This also applies to the above discussed gs-expansion, and the gs-reduction cryptographies. Naming the expansion variety gse, and the reduction version as gsr, we can identify the two conceptual combinations as: gre->gsr; and gsr->gse Or a longer series: gse-gsr-gse-gsr . . . . Or even: gse-gse-gsr-gsr-gsr-gse- . . . Or similar combination, if it becomes useful. In this introductory article we focus on the gse-gsr case.

Pse->gsr

The most visible weak point of gse is the apparent unchecked enlargement of the ciphertekt in comparison to the plaintext. On one hand this size increase deprives a cryptanalyst of realizing the size of the original message off the bat, and it also allows for increased security for more sensitive portions of the plaintext. On the other hand, the larger ciphertext would be burdensome to handle, transmit, and store on a routine basis. A gse-gsr configuration will counter this weakness head on. The enlarged ciphertext coming out of gse will be re-shrunk into same size, or close-size relative to the plaintext. This would still deprive the cryptanalyst of being certain about the size of the original message, but will keep the change of size under control. To accomplish the latter, it is even possible to expose the gsr map and its initial state, so that anyone could reconstruct the large size ciphertext which is produced by the preceding gre. This would simply save on storage and movement of the data. Security will be hinged solely on the gse part.

Changing Attitude Towards the Cryptographic Key

Bruce Schneier, "Applied Cryptography", $2^{nd}$ Edition, John Wiley, 1996, pp. 227–228, accesses the common attitude that the cryptographic key is a small secret which helps protect a larger secret—the plain message. Indeed the smallness of the key was a traditional preference. It began at the era when keys were to be memorized. Today, though, the small size of the key is of no critical advantage. A different approach will refer to the cryptographic key as the secret that is exchanged in safety today, to help you exchange other secrets tomorrow—secrets which are not known today. Yet, another approach will refer—perhaps even define—the cryptographic key as the part that should be changed, if and when there is a suspicion of compromised security. Thereby taking Kerckhoffs' principle on its head. A cryptographic system is considered secure, if when it is compromised (for whatever reason, and whatever method), it is sufficient to replace its key, to completely restore its security. Or say, that part which needs to be replaced in order to undo a breach of security—is the key. According to 'these two attitudes, there is no critical shortfall to be associated with the key complexity in this gs-cryptography. In fact, the complexity of the key allows for more robust recovery (from a breach), by selecting a very large and unpredictable next key. The more complexity and variability carried by the key, the less complexity is required of the underlying algorithm that is processing the plaintext and the key. This is in line with the philosophy of the Turing machine. The operational mechanism is as simple as possible. It is the input stream that contains the full complexity of the computing task. And thus, by changing the key complexity, it is possible to change the encryption strength on a virtually continuous scale.

SUMMARY

By substituting a set with an ordered list of some of its elements, one achieves a simple size increase (expansion) of information, and the reverse process yields a respective reduction. By defining these two exchanges through a graph structure, it is possible to define a cryptographic scheme which appears to offer interesting, rather useful, properties. Most intriguing, perhaps, is the notion of defeating cryptanalysis through equivocation, or say: deniability. A well designed product based on, these principle might relax some of today's apprehensions, and lure more people to commit more sensitive data to their own computers, and to their trusted partners. The apparent novelty of this cryptographic thinking is also its chief weakness. It has yet to attract the customary relentless and serious consideration of robustness and usefulness by the most excellent professionals in this field.

Overview of the Invention as a Tool for Inferential Visibility Adjustment of Data The invention describes a data expansion-reduction methodology, (the gs-system, which, lends itself to denial featured cryptography, named Daniel). It is comprised of:

data expansion and:

data reduction

Which are exercised in order to change the inferential visibility of data.

The defined GS System expansion is one-to-many: a certain data will expand in infinite ways to create infinity of different expansions.

The defined GS System reduction is one to one. A certain data will reduce to a single reduction.

Data Expansion

A defined body of data, g, ("guide"), is expanded to a larger body of data, s ("sequence").

g—>s s may contain more information than g

The inferential visibility of g is altered by the expansion.

s may be such that it is either easier or more difficult to extract conclusion, inference from it. When applied to cryptography s is created in a way that would make it more difficult to read, or understand in it, what is otherwise visible in g. When applied to pattern recognition, s is created in a way which makes it easier to see in it, read in it, infer from it, inference which is otherwise invisible in g.

The Expansion Procedure

Consider two sets X={X}n, Y={y}m. Denoted as type X and type Y. Construct an ordered list

XY which will be denoted as the 'guide'.

Replace each set in the guide with any sequence of the elements of each set. Thus k elements of X will precedent l elements of Y:

$$Xi, Xj, \ldots xr, yp, yq, \ldots yt$$

$$\longleftarrow k \longrightarrow \longleftarrow l \longrightarrow$$

The resultant list, called sequence, s, is an expansion of the guide g.

The (k+1) long list can be constructed in $n^k m^l$ ways. And since k,l are not restricted by any preset magnitude, the number of possible expansions, is infinite.

The basic guide-sequence (gs) expansion procedure is extendable to longer guides of two sets:

XYXYXY . . .

and to guides based on any number of sets {x}nx, {y}yn, {z}zn, {w}wn:

XYWZYWXYWZXYX . . .

In all such cases the guide will expand by replacing a set symbol with any sequence of its elements.

Since there are infinite expansion options, it is necessary to define a method by which an expansion option is selected.

Selecting an Expansion Option

The expansion of the guide, g, to the sequence s will be carried out via a set of rules, R.

We define one set of rules, R, which are based on a construct called "Map". The respective selection is called Map Selection, or Map Expansion.

Map Expansion

A Map Expansion is carried out by selecting a path, a sequence, within a map.

The following sections define maps path selection rules

The path determines a sequence of set elements.

Map Defined

A map is a set of bridged elements.

A bridge is a "connection line" between-two elements. The connection line is an abstract entity. It does not have to be drawn in space, and is identified as to existence or inexistence. A bridge defines a step. A step is an abstract notion of crossing over from one element to another.

Steps define a Path: a path is a sequence of steps.

A set {X}n of elements x1, x2, x3, . . . xn is a map, if, and only if there is a path from each element to any other element in {X}n. The map is nominally called "key" (K).

Path Selection Rules

Any map may be associated with a "pointer" which is a form of fingering a single element as the "pointed to" element, or the "focus element", or alternatively the "state element".

A step may be used to alter the focus element to another one across a "bridge". Since a path is a sequence of steps, then, path selection rules amount to rules for changing the focus element of a set in a map.

For any given focus element the rules will determine which bridge to select to switch the focus element to the one at the other end of that bridge.

Hence, path selection rules, become step selection rules.

The step selection rules presented here are

MAP Determined

MAP and Path Determined

Map determined: the rules refer only to the map as information source for determination of the next step.

Map and Path Determined: the rules refer to the map, and to the path which led to the focus element, as information source for determination of the next step.

Map Determined Rules

The map determined rules are distinguished according to their MAP visibility. On one end, the next step selection may be determined by considering the entire map (the elements, and the array of bridges), and on the other end, the next step selection may be determined by considering only the elements which are one bridge away from the focus element. And in between there are cases where any desired portion of the map is being considered in evaluating the selection of the next step.

Map and Path Determined Rules

These rules refer to the map and the marked path (up to the current element) as the information source for determination of the next step.

The map visibility can change as discussed before. The same for the path visibility. It may include one step backwards, or the entire path up that the current focus element. And any way in between.

Data Reduction

A defined body of data, s, ("sequence"), is reduced to a smaller body of data, g ("guide").

s—>g s may contain more information than g.

The inferential visibility of s is altered by the expansion g may be such that it is either easier or more difficult to extract conclusions, inference from it. When applied to cryptography g is created in a way that would make it more difficult to read, or understand in it, what is otherwise visible in s. When applied to pattern recognition, g is created in a way which makes it easier to see in it, read in it, infer from it, inference which is otherwise invisible in s.

Reduction Procedure

Consider two sets X={x}n, Y={y}m. Denoted as type X and type Y. Construct an ordered list (sequence) such that k elements of X will precede l elements of Y:

$$X_i, X_j, \ldots x_r, y_p, \ y_q, \ldots y_t$$
$$\longleftarrow k \longrightarrow \longleftarrow l \longrightarrow$$

The (k+l) long sequence can be reduced according to the following rule: all adjacent elements of x are marked by the set symbol X, and correspondingly for Y. This rule will reduce the above sequence into:

XY which will be denoted as the 'guide'.

Note that regardless of the values of k,n, l and m (all >=1), and irrespective of the identity of the elements in the x- and y- sequences, the guide will always look the same.

The basic guide-sequence (gs) expansion-reduction procedure can easily be expanded to alternate sequences:

x1, . . . x2,y1, . . . ,y2,xm,xn, . . . yt,yr, . . .

which will be reduced to:

XYXY . . .

Similarly for cases based on any-number of sets {X}nx, {Y}yn, {Z}zn, {W}wn:

x1,x2, . . . xn,z1, . . . zd,y1,y2, . . . yk, w1,w2, . . . wm . . .

which reduce to:

XZYW . . .

The reduction procedure is thus completely defined.

Net Zero Effect

Since expansion and reduction are opposites, they lend themselves to a combination which yields a zero net effect. A certain data, g, will expand to an expansion s, which will reduce back to g. In such matching the data g, will expand to infinite option s, all of which will reduce to the same original g.

Notationally, a guide, g may be expanded through an expansion algorithm E, and yield s. s, in turn, may be processed by the reverse algorithm, D (De-expansion) and reproduce g.

$$g=D(E(g))$$

Cryptographic Application

In applying the GS System to cryptography one exploits:
1. The asymmetry of the expansion-reduction pair.
2. Indirection in data representation.

Asymmetry of the Expansion-reduction Pair

Since an infinite number of expanded data, s1, s2, s3, . . . , will reduce into the same data g, one is in a position to communicate g over a hostile line, exposed to eavesdroppers. The intended reader will be equipped with a selection algorithm to expand g into a particular s, (the respective plaintext), while the eavesdropper in possession of just g, will be looking at infinite options for s.

Indirection in Data Representation

A sequence of set elements, s, is defined by a path marked on a map. The path is defined as a series of bridges from one element to another. This is an indirect representation of data. Each element is defined by another element and a series of bridges from it to the element to be defined.

The map on its own is not sufficient to recreate the sequence. The path alone is not sufficient to recreate the sequence. The map and the path are needed in combination for the sequence to be defined.

From a cryptographic stand point, either the map or the path definition can serve as the cryptographic key, while the other will serve as the exposed ciphertext.

Pattern Recognition Application

Patterns in data may be more visible when the format and representation of the data changes. Since such visibility is the object in pattern recognition, one could use the GS System in both directions:

1. Expansion—to expose patterns
2. Reduction—to expose patterns.

Data expansion will amplify and reveal hidden patterns that are not visible in the shorter version. Data Reduction will get rid of "noise" and focus its reader on the essential attributes of the respective data elements.

Expansion and Reduction can be applied in any sequence, and thus create a chain of expansion followed by an expansion, an expansion followed by a reduction, or a reduction followed by a reduction, and a reduction followed by an expansion. For as many times as desired. Each application of expansion may use different maps and different path selection rules. This will be part of a pattern search strategy.

This application will be defined with respect to the most basic category of pattern recognition, namely: discriminant analysis. What applies to this category can be readily applied to more complex categories which are all readily extendable from discriminant analysis.

Let A, and B be two mutually exclusive attributes of elements y1, y2, y3, . . . yn of a set Y={Y}n. Let Ya be a subset of Y such that all elements in Ya have attribute A, (and hot B). Let Yb be a subset of Y such that all elements in Yb have attribute B, (and not A). Let x be an element of Y for which there is no knowledge as to its attribute A, or B. Such knowledge is sought based on the knowledge of Ya and Yb. One thus tries to find a discriminating pattern in the Ya elements, which is different in the Yb elements, and then measure that pattern in x to determine whether it is associated with attribute A or attribute B.

Expansion to Expose Patterns

In the expansion option, the Y elements will be considered as guides, g, which will then be expanded through this expansion algorithm, E to transform into their respective sequence, s:

ti $si=E(g_i,K,R)$ where $g_i=y_i$, and K and R are the key and the expansion rules as described above.

By trying various combinations of K and R, one will iterate and converge on an expansion that would expose a pattern in Ya elements which will distinguish them from the Yb elements.

The iterations will be based on a feedback from the current result. The sought after patterns may be of any quantitative nature. The larger the si sequences, the greater the chance to find somewhere in that long string a discriminating section.

Examples for Quantitative Pattern Tests

A pattern may be defined in many ways, for example:
1. frequency of a given symbol in the s string.
2. frequency of a given set of two ordered letters (in the s string).
3. frequency of a given n-size substring in the s string.
4. How often does one symbol appear 4 or less symbols away from another symbol.

Many other will apply.

Reduction to Expose Patterns

In this approach the y elements will be considered a sequence, s, and a reduction algorithm, D, will use a map, K, to reduce the s value to a corresponding, g, guide—much shorter data element.

$$gi=D(si,K)$$

where si=yi.

The shorter gi may get rid of "noise" present in si, and expose a clear pattern in Ya elements, that is not present in Yb elements.

Since the reduction rules are fixed, one must only vary the key, K, to search for a useful reduction, (one that would expose a pattern).

It will be readily seen by one of ordinary skill in the art that the present invention fulfills all of the objects set forth above. After reading the foregoing specification one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for encrypting a plaintext message to produce a cyphertext message, based on a symmetric cryptographic key, the method comprising:

(a) providing a shared key as a graph, expressed in a computer-readable storage medium, wherein:

the graph comprises a plurality of vertices interconnected by a plurality of edges, whereby each edge connects two vertices, such that it is possible to travel from any one of the vertices to any other one of the vertices by following one or more of the edges;

each of the plurality of vertices is identified by a letter from a first alphabet; and each of the plurality of edges is identified by a letter from a second alphabet, such that no two edges which connect to the same vertex are marked by the same letter;

(b) providing the plaintext message in the first alphabet, where the alphabet is comprised of n letters, and where the provided plaintext message is constructed as follows:

(b.1) the original plain language message comprised of the English or other human language alphabet, plus digits and punctuation marks, is expressed via a look-up table through an alphabet comprised of (n−1) letters, and (b.2) where the plaintext sequence expressed via the (n−1) alphabet is processed by interposing an n-th letter between any two letters in the sequence where a letter follows the same letter, thereby creating a plaintext sequence expressed through an n-letter alphabet, and that sequence is free from occurrences where a letter follows the same letter;

(c) traversing the graph along its edges in accordance with the plaintext message provided in the first alphabet to cover an ordered set of the vertices, the ordered set of the vertices corresponding to the order of the letters of the first alphabet in the plaintext message, wherein a pathway taken among the ordered set of the vertices defines an ordered set of the edges; and where the first vertex in the ordered set of vertices is preset, and is part of the encryption procedure, and where any vertex and any edge can be revisited more than once in the pathway, and some vertices and some edges may not be part of the path at all;

(d) forming an ordered set of letters of the second alphabet corresponding to the ordered set of the edges; and (e) taking the ordered set of letters of the second alphabet as the cyphertext message.

2. A method for encrypting a plaintext message to produce a cyphertext message, based on a symmetric cryptographic key, the method comprising:

(a) providing a shared key as a graph expressed in a computer-readable storage medium, wherein:

the graph comprises a plurality of vertices configured on a two-dimensional lattice, like squares of a chessboard, where the vertices which are not on the outside perimeter of the lattice, are connected to their four neighbors, one upward, one downward, one leftward, and one rightward, with four corresponding edges, and where vertices in the lattice which do not have a neighboring vertex because they are at the outside perimeter of the lattice, have only edges to their existing neighbors;

it is possible to travel from any one of the vertices to any other one of the vertices by traveling along one or more of the edges;

each of the plurality of vertices is identified by a letter from a first alphabet of four letters; (X,Y,Z,W) and each of the plurality of edges is identified by a letter from a second alphabet of four letters(U,D,R,L);

(b) translating the plaintext message into the first alphabet such that the translated plaintext message uses only three letters of the first alphabet, (X,Y,Z);

(c) in the translated plaintext message, whenever a letter in the sequence follows the same letter, (e.g. XX), interposing the fourth letter, (W), (e.g. XX→XWX), of the first alphabet, to produce a translated and converted plaintext message in which no letter in the plaintext sequence follows the same letter;

(d) traversing the graph along its edges in accordance with the plaintext message provided in the first alphabet to cover an ordered set of the vertices, the ordered set of the vertices corresponding to the order of the letters of the first alphabet in the plaintext message, wherein a path taken among the ordered set of the vertices defines an ordered set of the edges;

(e) forming an ordered set of letters of the second alphabet corresponding to the ordered set of the edges; and (f) taking the ordered set of letters of the second alphabet as the cyphertext message.

3. The method of claim 1, wherein the vertices in the graph are marked with letters of the first alphabet such that each letter of the alphabet is marked on at least one vertex.

4. The method of claim 2, wherein the vertices in the graph are marked with letters of the first alphabet such that each letter of the alphabet is marked on at least one vertex.

5. The method of claim 1, wherein all the vertices in the graph are marked with letters of the first alphabet such that from each vertex, ("the reference vertex"), there is a pathway, (a sequence of edges), ending with a vertex marked by another letter of the first alphabet, and where all the vertices in the pathway, except the last one, are marked with the same letter as the first vertex, (the reference vertex); and this property will be satisfied for each vertex in the graph, and for each vertex, in its turn as a reference vertex, this property will be satisfied with respect to all other letters of the first alphabet, except the one that marks the reference vertex.

6. The method of claim 2, wherein all the vertices in the graph are marked with letters of the first alphabet such that from each vertex, ("the reference vertex"), there is a pathway, (a sequence of edges), ending with a vertex marked by another letter of the first alphabet, and where all the vertices in the pathway, except the last one, are marked with the same letter as the first vertex, (the reference vertex); and this property will be satisfied for each vertex in the graph, and for each vertex, in its turn as a reference vertex, this property will be satisfied with respect to all other letters of the first alphabet, except the one that marks the reference vertex.

7. A method of decrypting a ciphertext created according to method 40 whereby the sequence of letters of the second alphabet which is expressed in the ciphertext is used to retrace the pathway which was charted in said method, by starting the pathway at the preset initial vertex which was used in said method, choosing the edge connected to this initial vertex according to the first letter of the ciphertext, and thus identifying the next vertex in the pathway; continuing the pathway by selecting the edge identified by the second letter of the ciphertext, and thus identifying the second vertex of the pathway; continuing to so identify each successive vertex in the pathway by selecting from each identified vertex, the next edge according to the next letter of the ciphertext, so continuing until the ciphertext letters are exhausted, at which point, the identified vertex of the pathway are the same vertices in the same order as the ones assembled in said method, and the letters of the first alphabet that mark the identified vertices of the pathway, comprise a sequence which is undergoing a procedure by which all sequences of letters where one letter follows the same letter, are removed, and replaced by a single letter, the same as the letter of the removed sequence, thereby the remaining sequence is free from any occurrence whereby one letter follows the same letter; removing the n-th letter from the sequence, and thereby regenerating the plaintext sequence.

* * * * *